(12) United States Patent
Yokoyama et al.

(10) Patent No.: US 11,637,283 B2
(45) Date of Patent: Apr. 25, 2023

(54) POSITIVE ELECTRODE ACTIVE MATERIAL FOR NON-AQUEOUS ELECTROLYTE SECONDARY BATTERIES, PRODUCTION METHOD THEREFOR, AND NON-AQUEOUS ELECTROLYTE SECONDARY BATTERIES USING SAID POSITIVE ELECTRODE ACTIVE MATERIAL

(71) Applicant: SUMITOMO METAL MINING CO., LTD., Tokyo (JP)

(72) Inventors: Jun Yokoyama, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 253 days.

(21) Appl. No.: 16/642,904

(22) PCT Filed: Jul. 31, 2018

(86) PCT No.: PCT/JP2018/028737
§ 371 (c)(1),
(2) Date: Feb. 28, 2020

(87) PCT Pub. No.: WO2019/044337
PCT Pub. Date: Mar. 7, 2019

(65) Prior Publication Data
US 2020/0343546 A1 Oct. 29, 2020

(30) Foreign Application Priority Data
Aug. 29, 2017 (JP) .............................. JP2017-164348

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/0471* (2013.01);
(Continued)

(58) Field of Classification Search
CPC ... C01G 53/006; C01G 53/50; C01P 2002/74; C01P 2004/84; H01M 10/0525;
(Continued)

(56) References Cited

U.S. PATENT DOCUMENTS

2007/0231691 A1 10/2007 Abe et al.
2015/0228974 A1 8/2015 Kokado et al.
(Continued)

FOREIGN PATENT DOCUMENTS

EP 3101716 A1 12/2016
JP H05-242891 A 9/1993
(Continued)

OTHER PUBLICATIONS

Supplementary European Patent Search Report dated May 4, 2021, issued for the corresponding EP patent application 18851417.8.
(Continued)

*Primary Examiner* — Victoria H Lynch
(74) *Attorney, Agent, or Firm* — Locke Lord LLP; James E. Armstrong, IV; Nicholas J. DiCeglie, Jr.

(57) ABSTRACT

Provided is a positive electrode active material for non-aqueous electrolyte secondary batteries for making high capacity and high output compatible, non-aqueous electrolyte secondary batteries, to which the positive electrode active material is adopted, and a production method for a positive electrode active material in which the positive electrode active material can be easily produced even on an industrial scale. A positive electrode active material for non-aqueous electrolyte secondary batteries, comprising: primary particles of a lithium nickel composite oxide rep-
(Continued)

resented by at least General Formula: $Li_zNi_{1-x-y}Co_xM_yO_2$ ($0.95 \leq z \leq 1.03$, $0 < x \leq 0.20$, $0 < y \leq 0.10$, $x+y \leq 0.20$, and M is at least one type of element selected from Mg, Al, Ca, Ti, V, Cr, Mn, Nb, Zr, and Mo); and secondary particles configured by aggregating the primary particles, wherein an LiAl compound is provided on surfaces of the primary particles.

13 Claims, 2 Drawing Sheets

(51) Int. Cl.
    *H01M 4/04*     (2006.01)
    *H01M 4/131*     (2010.01)
    *H01M 4/505*     (2010.01)
    *H01M 10/0525*     (2010.01)
    *H01M 4/02*     (2006.01)

(52) U.S. Cl.
    CPC ............ *H01M 4/131* (2013.01); *H01M 4/505* (2013.01); *H01M 10/0525* (2013.01); *C01P 2002/74* (2013.01); *H01M 2004/028* (2013.01)

(58) Field of Classification Search
    CPC ......... H01M 2004/028; H01M 4/0471; H01M 4/131; H01M 4/366; H01M 4/505; H01M 4/525; Y02E 60/10
    See application file for complete search history.

(56) References Cited

U.S. PATENT DOCUMENTS

| | | |
|---|---|---|
| 2016/0118656 A1 | 4/2016 | Nakayama et al. |
| 2017/0294651 A1 | 10/2017 | Choi et al. |
| 2017/0309891 A1 | 10/2017 | Matsui et al. |
| 2019/0020023 A1 | 1/2019 | Yokoyama et al. |
| 2019/0334170 A1 | 10/2019 | Takamori et al. |

FOREIGN PATENT DOCUMENTS

| | | |
|---|---|---|
| JP | 2003-017056 A | 1/2003 |
| JP | 2007-103141 A | 4/2007 |
| JP | 2007-273108 A | 10/2007 |
| JP | 2010-129471 A | 6/2010 |
| JP | 2011-23121 A | 2/2011 |
| JP | 2012-079464 A | 4/2012 |
| JP | 2017-084674 A | 5/2017 |
| JP | 2018-106892 A | 7/2018 |
| NO | 2011/007751 A1 | 1/2011 |
| NO | 2014/189108 A1 | 11/2014 |
| NO | 2016/108376 A1 | 7/2016 |
| WO | 2015/111740 A1 | 7/2015 |
| WO | 2016/088471 A1 | 6/2016 |
| WO | 2017/073682 A1 | 5/2017 |
| WO | 2018/123817 A1 | 7/2018 |

OTHER PUBLICATIONS

International Search Report dated Sep. 11, 2018, issued for PCT/JP2018/028737.

POSITIVE ELECTRODE ACTIVE MATERIAL FOR NON-AQUEOUS ELECTROLYTE SECONDARY BATTERIES, PRODUCTION METHOD THEREFOR, AND NON-AQUEOUS ELECTROLYTE SECONDARY BATTERIES USING SAID POSITIVE ELECTRODE ACTIVE MATERIAL

CROSS REFERENCE TO RELATED APPLICATIONS

This application is related to application: "POSITIVE ELECTRODE ACTIVE MATERIAL FOR NON-AQUEOUS ELECTROLYTE SECONDARY BATTERIES, PRODUCTION METHOD THEREFOR, AND NON-AQUEOUS ELECTROLYTE SECONDARY BATTERIES USING SAID POSITIVE ELECTRODE ACTIVE MATERIAL" filed even date herewith in the names of Jun Yokoyama and Kazuomi Ryoshi as a national phase entry of PCT/JP2018/028739, which application is assigned to the assignee of the present application and is incorporated by reference herein.

TECHNICAL FIELD

The present invention relates to a positive electrode active material for non-aqueous electrolyte secondary batteries and a production method therefor, and non-aqueous electrolyte secondary batteries using the positive electrode active material.

BACKGROUND ART

Recently, a demand for non-aqueous electrolyte secondary batteries as a chargeable/dischargeable power source has rapidly increased along with the rapid expansion of a small electronic device such as a mobile phone and a laptop computer.

As a positive electrode active material for such non-aqueous electrolyte secondary batteries, a lithium nickel composite oxide represented by lithium nickelate ($LiNiO_2$), a lithium manganese composite oxide represented by lithium manganate ($LiMnO_2$), and the like have been widely used, along with a lithium cobalt composite oxide represented by lithium cobaltite ($LiCoO_2$).

It should be noted that a problem arises in that the reserves of the lithium cobaltite are so small that its price is high, and the lithium cobaltite contains, as a main component, cobalt with a large price change due to supply instability. For this reason, the lithium nickel composite oxide or the lithium manganese composite oxide containing nickel or manganese that is comparatively inexpensive as a main component has attracted attention, from the viewpoint of the cost.

However, the lithium manganate is excellent in thermal stability, compared to the lithium cobaltite, but has an extremely small charge and discharge capacity, compared to other materials, and also has extremely short charge and discharge cycle characteristic exhibiting the life, and thus, has many practical problems as batteries. On the other hand, the lithium nickelate has a charge and discharge capacity larger than that of the lithium cobaltite, and thus, has been expected as a positive electrode active material for enabling to produce batteries that are inexpensive and have a high-energy density.

The lithium nickelate is generally produced by mixing and firing a lithium compound and a nickel compound such as nickel hydroxide or nickel oxyhydroxide, and is in the shape of a powder in which primary particles are monodispersed or a powder of secondary particles with voids that are aggregates of the primary particles, but has low thermal stability in a charge state, compared to the lithium cobaltite, in any shape.

That is, pure lithium nickelate has a problem in the thermal stability, the charge and discharge cycle characteristic, or the like. Thus, it could not have been used for practical batteries. This is because the stability of a crystal structure in the charge state is lower than that of the lithium cobaltite.

For this reason, in order to stabilize the crystal structure in a state where lithium is removed during a charge procedure, and to obtain a lithium nickel composite oxide having excellent thermal stability and excellent charge and discharge cycle characteristic, as a positive electrode active material, in general, a part of nickel in the lithium nickel composite oxide is substituted with any other material.

For example, Patent Literature 1 proposes non-aqueous batteries using $Li_aM_bNi_cCo_dO_e$ (M is at least one type of metal selected from the group consisting of Al, Mn, Sn, In, Fe, V, Cu, Mg, Ti, Zn, and Mo, and $0<a<1.3$, $0.02 \leq b \leq 0.5$, $0.02 \leq d/c+d \leq 0.9$, and $1.8<e<2.2$, further $b+c+d=1$), as the positive electrode active material.

In addition, a technology of water washing lithium nickelate after firing has been developed, as a method of improving the thermal stability of the lithium nickel composite oxide.

For example, Patent Literature 2 proposes a production method for a positive electrode active material for non-aqueous electrolyte secondary batteries, in which a nickel oxide is prepared by roasting a nickel hydroxide or a nickel oxyhydroxide at a temperature of 600° C. to 1100° C. in the atmosphere, and is mixed with a lithium compound, and then, is fired in a range where the highest temperature is 650° C. to 850° C. in an oxygen atmosphere, and the fired powder obtained is washed with water within a time for satisfying A≤B/40 (in the expression, A represents a water washing time in the unit of minutes, and B represents a slurry concentration of the fired powder in the unit of g/L) in water, and is filtered and dried.

However, when a part of nickel in the lithium nickel composite oxide is substituted with other materials, and a large amount of elemental substitution is performed (in other words, a nickel ratio is decreased), the thermal stability increases, but a battery capacity decreases. On the other hand, in order to prevent a decrease in the battery capacity, a small amount of elemental substitution is performed (in other words, the nickel ratio is increased), the thermal stability is not sufficiently improved. Furthermore, if the nickel ratio increases, cation mixing easily occurs when firing, and it is difficult to perform synthesis.

In addition, it is assumed that a positive electrode active material having a high capacity, excellent thermal stability, and excellent storage characteristic in a high temperature environment can be obtained, if the lithium nickelate after firing is washed with water, when it is adopted to the non-aqueous electrolyte secondary batteries. However, there has not been obtained any material sufficiently corresponding to a demand for enlargement in capacity or higher output.

On the other hand, in order to improve output characteristic, a method of adding a tungsten compound to the lithium nickel composite oxide is considered.

For example, Patent Literature 3 proposes a positive electrode active material for non-aqueous electrolyte secondary batteries in which in a lithium-metal composite oxide powder that is represented by General Formula of $Li_zNi_{1-x-y}Co_xM_yO_2$ (here, $0.10 \leq x \leq 0.35$, $0 \leq y \leq 0.35$, $0.97 \leq z \leq 1.20$, and M is at least one type of element selected from Mn, V, Mg, Mo, Nb, Ti, and Al), and is formed of primary particles and secondary particles configured by aggregating the primary particles, the surfaces of the primary particles contain fine particles containing W and Li.

However, in the positive electrode active material described above, the output characteristic is improved, but the nickel ratio is low. Thus, there is a demand for enlargement in capacity. In addition, it is also necessary to consider the thermal stability at the time of increasing the nickel ratio.

Therefore, the lithium nickel composite oxide in which a part of nickel is substituted with any other material has been variously developed. In the present state, however, when the lithium nickel composite oxide is adopted to the non-aqueous electrolyte secondary batteries, there has not been obtained a positive electrode active material formed of a lithium nickel composite oxide that can sufficiently correspond to a demand for enlargement in capacity or higher output.

CITATION LIST

Patent Literature

Patent Literature 1: JP 5-242891 A
Patent Literature 2: JP 2007-273108 A
Patent Literature 3: JP 2012-079464 A

SUMMARY OF INVENTION

Technical Problem

In consideration of the problems described above, an object of the present invention is to provide a positive electrode active material for non-aqueous electrolyte secondary batteries that is capable of making a high capacity and high output compatible when used in a positive electrode material, and non-aqueous electrolyte secondary batteries having a high capacity, high output, and high safety with the positive electrode active material adopted thereto.

In addition, another object of the present invention is to provide a production method for a positive electrode active material, capable of easily producing the positive electrode active material described above, even on an industrial scale.

Solution to Problem

In order to attain the objects described above, the present inventors have conducted intensive studies about powder characteristic of a lithium-metal composite oxide that is used as the positive electrode active material for non-aqueous electrolyte secondary batteries and the influence on positive electrode resistance of the batteries, and have found that an LiAl compound is formed on the surfaces of primary particles configuring the lithium nickel composite oxide, thereby enabling to make a high capacity and high output compatible.

Further, as the production method thereof, the present inventors have found that the LiAl compound described above can be formed, by controlling a firing temperature in a specific range after mixing a nickel compound and a lithium compound, and by adding an aluminum compound to the lithium nickel composite oxide in a wet state and performing a thermal treatment therefor, and have come to complete the present invention.

That is, the first invention of the present invention is a positive electrode active material for non-aqueous electrolyte secondary batteries, containing: primary particles of a lithium nickel composite oxide represented by at least General Formula: $Li_zNi_{1-x-y}Co_xM_yO_2$ ($0.95 \leq z \leq 1.03$, $0 < x \leq 0.20$, $0 < y \leq 0.10$, $x+y \leq 0.20$, and M is at least one type of element selected from Mg, Al, Ca, Ti, V, Cr, Mn, Nb, Zr, and Mo); and secondary particles configured by aggregating the primary particles, wherein an LiAl compound is provided on surfaces of the primary particles.

The second invention of the present invention is the positive electrode active material for non-aqueous electrolyte secondary batteries of the first invention, in which an Al amount contained in the LiAl compound is 0.01 atom % to 0.50 atom % with respect to the total number of atoms of Ni, Co, and M contained in the lithium nickel composite oxide of the primary particles.

The third invention of the present invention is the positive electrode active material for non-aqueous electrolyte secondary batteries of the first invention and the second invention, in which the LiAl compound is at least one type selected from the group consisting of $LiAl_2(OH)_7 \cdot xH_2O$, $LiH(AlO_2)_2 \cdot 5H_2O$, and $LiAlO_2$.

The fourth invention of the present invention is the positive electrode active material for non-aqueous electrolyte secondary batteries of the first invention to the third invention, in which a crystallite diameter that is calculated from a peak of a (003) surface in X-ray diffraction (XRD) of the lithium nickel composite oxide is 1350 Å to 1500 Å.

The fifth invention of the present invention is a production method for a positive electrode active material for non-aqueous electrolyte secondary batteries containing a lithium nickel composite oxide, the method including processes of (A) to (D) as will be described below in the order of the processes of (A) to (D):

(A) a process of mixing a nickel compound containing at least nickel, cobalt, and at least one type selected from Mg, Al, Ca, Ti, V, Cr, Mn, Nb, Zr, and Mo, and a lithium compound, and then, of firing the compounds in a temperature range of 720° C. to 770° C. in an oxidizing atmosphere, and thus, of preparing a fired powder of a lithium nickel composite oxide that is represented by General Formula: $Li_zNi_{1-x-y}Co_xM_yO_2$ (here, $0.98 \leq z \leq 1.05$, $0 < x \leq 0.20$, $0 < y \leq 0.10$, $x+y \leq 0.20$, and M is at least one type of element selected from Mg, Al, Ca, Ti, V, Cr, Mn, Nb, Zr, and Mo) and contains primary particles and secondary particles configured by aggregating the primary particles;

(B) a process of forming a slurry such that an amount of the fired powder of the lithium nickel composite oxide is 1000 g to 2000 g with respect to 1 L of water, and of obtaining a cleaned cake by performing a water washing treatment with respect to the fired powder of the lithium nickel composite oxide that is prepared in the process of (A);

(C) a process of adding an aluminum compound to the cleaned cake of the process of (B), and of mixing the compound and the cake; and (D) a process of performing a thermal treatment with respect to the mixture of the fired powder of the lithium nickel composite oxide and the aluminum compound that is prepared in the process of (C), and of forming an LiAl compound on surfaces of the primary particles of the fired powder of the lithium nickel composite oxide.

The sixth invention of the present invention is the production method for a positive electrode active material for non-aqueous electrolyte secondary batteries of the fifth invention, in which an Al amount contained in the aluminum compound is 0.01 atom % to 0.50 atom % with respect to the total number of atoms of Ni, Co, and M contained in the lithium nickel composite oxide.

The seventh invention of the present invention is the production method for a positive electrode active material for non-aqueous electrolyte secondary batteries of the fifth invention and the sixth invention, in which the thermal treatment of the process of (D) is performed at 100° C. to 600° C. in an oxygen atmosphere or a vacuum atmosphere.

The eighth invention of the present invention is the production method for a positive electrode active material for non-aqueous electrolyte secondary batteries of the fifth invention to the seventh invention, in which the nickel compound is any one of a nickel composite hydroxide, a nickel oxy composite hydroxide obtained by performing oxidation with respect to the nickel composite hydroxide with an oxidant, a nickel composite oxide obtained by performing oxidation roasting with respect to the nickel oxy composite hydroxide at a temperature of 500° C. to 750° C., a nickel composite oxide obtained by performing oxidation roasting with respect to the nickel composite hydroxide at a temperature of 500° C. to 750° C., and a nickel composite oxide obtained by performing oxidation roasting with respect to a mixture of the nickel composite hydroxide and the nickel oxy composite hydroxide at a temperature of 500° C. to 750° C.

The ninth invention of the present invention is the production method for a positive electrode active material for non-aqueous electrolyte secondary batteries of the fifth invention to the eighth invention, in which the lithium compound is at least one type selected from the group consisting of a hydroxide, an oxyhydroxide, an oxide, a carbonate, a nitrate, and a halide of lithium.

The tenth invention of the present invention is the production method for a positive electrode active material for non-aqueous electrolyte secondary batteries of the fifth invention to the ninth invention, in which, in the process of (A), a mixing ratio of the nickel compound and the lithium compound is adjusted such that a lithium amount in the lithium compound with respect to a total amount of all metal elements in the nickel compound is at a molar ratio of 0.98 to 1.05.

The eleventh invention of the present invention is the production method for a positive electrode active material for non-aqueous electrolyte secondary batteries of the fifth invention to the tenth invention, in which, in the process of (B), a water washing temperature during the water washing treatment is adjusted to 10° C. to 40° C.

The twelfth invention of the present invention is the production method for a positive electrode active material for non-aqueous electrolyte secondary batteries of the fifth invention to the eleventh invention, in which the aluminum compound is at least one type selected from the group consisting of aluminum hydroxide and aluminum oxide.

The thirteenth invention of the present invention is a non-aqueous electrolyte secondary battery, including: a positive electrode containing the positive electrode active material for non-aqueous electrolyte secondary batteries according to any one of the first invention to the fourth invention.

Advantageous Effects of Invention

According to the present invention, it is possible to obtain the positive electrode active material for non-aqueous electrolyte secondary batteries for enabling to make a high capacity and high output compatible when used in the positive electrode material of the non-aqueous electrolyte secondary batteries, and also has excellent safety.

Further, the production method thereof is suitable for easily producing the positive electrode active material for non-aqueous electrolyte secondary batteries on an industrial scale, and has an extremely high industrial value.

DESCRIPTION OF EMBODIMENTS

Figure 1:
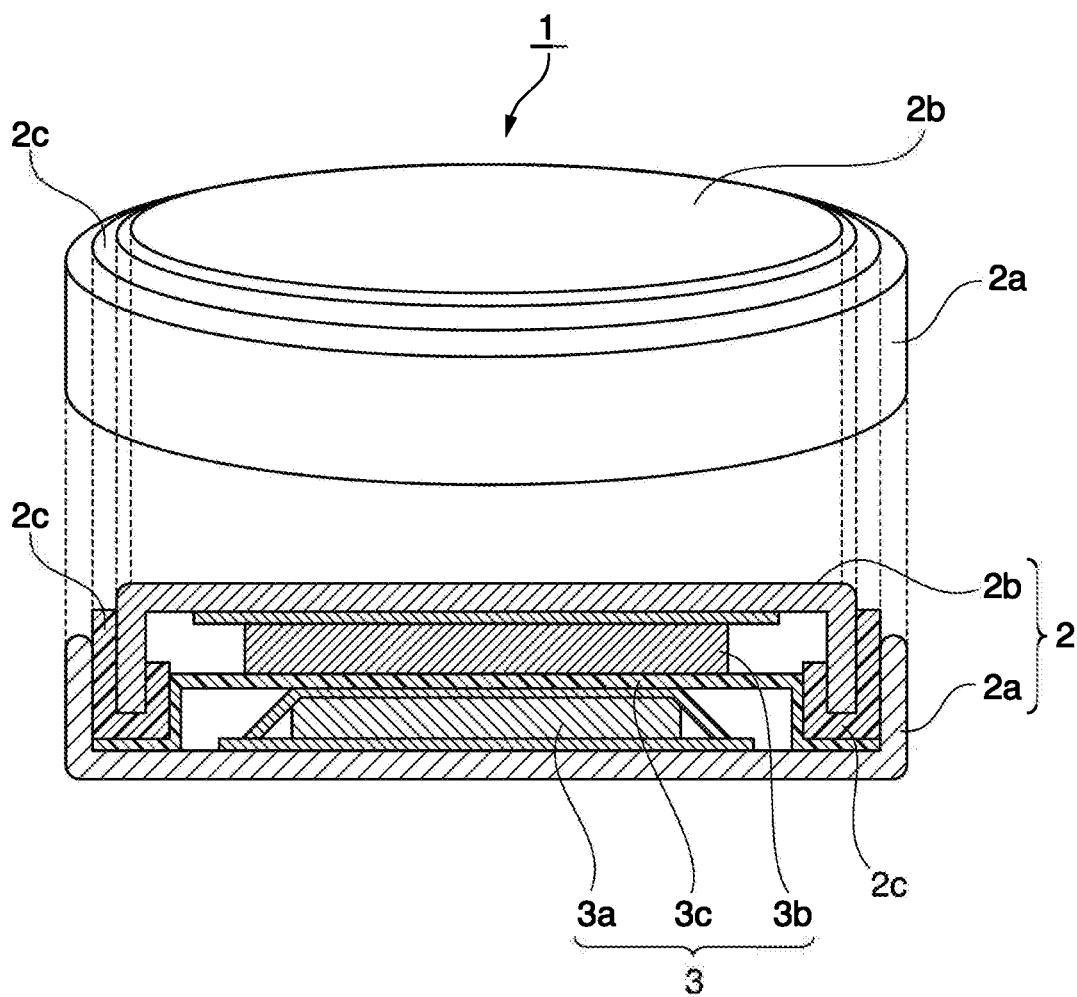
FIG. 1 is a schematic cross sectional view of a coin-type battery 1 that is used in battery evaluation.

Hereinafter, in the present invention, first, a positive electrode active material of the present invention will be described, and then, a production method thereof, and non-aqueous electrolyte secondary batteries using the positive electrode active material according to the present invention will be described.

(1) Positive Electrode Active Material for Non-Aqueous Electrolyte Secondary Battery A positive electrode active material for non-aqueous electrolyte secondary batteries of the present invention (hereinafter, simply referred to as a positive electrode active material) is a positive electrode active material for non-aqueous electrolyte secondary batteries containing primary particles of a lithium nickel composite oxide represented by at least General Formula: $Li_zNi_{1-x-y}Co_xM_yO_2$ (0.95≤z≤1.03, 0<x≤0.20, 0<y≤0.10, x+y≤0.20, and M is at least one type of element selected from Mg, Al, Ca, Ti, V, Cr, Mn, Nb, Zr, and Mo) and secondary particles configured by aggregating the primary particles, in which a particulate LiAl compound is contained on the surfaces of the primary particles.

Here, the lithium nickel composite oxide is a base material for forming the LiAl compound on the surfaces of the primary particles, and the positive electrode active material as will be described below implies a combination of the primary particles containing the particulate LiAl compound on the surfaces and the secondary particles configured by aggregating the primary particles.

[Composition]

The positive electrode active material of the present invention is the lithium nickel composite oxide that is at least a hexagonal layered compound, and in General Formula: $Li_zNi_{1-x-y}Co_xM_yO_2$ (0.95≤z≤1.03, 0<x≤0.20, 0<y≤0.10, x+y≤0.20, and M is at least one type of element selected from Mg, Al, Ca, Ti, V, Cr, Mn, Nb, Zr, and Mo), (1-x-y) indicating the content of nickel (Ni) is 0.80 or more and less than 1.

In the positive electrode active material of the present invention, enlargement in capacity can be attained as the content of nickel increases when used as the positive electrode active material. However, when the content of nickel excessively increases, thermal stability is not sufficiently obtained, and cation mixing that a metal element such as Ni is mixed into a lithium layer tends to easily occur when firing. On the other hand, in a case where the content of nickel decreases, a capacity decreases, and even when increasing filling properties of a positive electrode, a capacity per a battery volume is not sufficiently obtained.

Therefore, the content of nickel in the lithium nickel composite oxide of the positive electrode active material of the present invention is preferably 0.80 or more and 0.98 or less, more preferably 0.85 or more and 0.950 or less, and even more preferably 0.86 or more and 0.95 or less.

x indicating the content of cobalt (Co) is $0<x\leq0.20$, preferably $0.02\leq x\leq0.15$, and more preferably $0.03\leq x\leq0.12$.

In the above-described range of the content of cobalt, it is possible to obtain excellent cycle characteristic and excellent thermal stability. The content of cobalt increases, and thus, it is possible to improve the cycle characteristic of the positive electrode active material. However, when the content of cobalt is greater than 0.20, it is difficult to attain the enlargement in capacity of the positive electrode active material.

In addition, y indicating the content of at least one type of element M selected from Mg, Al, Ca, Ti, V, Cr, Mn, Nb, Zr, and Mo is $0<y\leq0.10$, preferably $0.01\leq y\leq0.04$, and more preferably $0.01\leq y\leq0.03$. In particular, y indicating the content of M is set to 0.04 or less. Thus, it is possible to set a crystallite diameter that is calculated from a peak of a (003) surface in X-ray diffraction (XRD) to 1350 Å or more, and to obtain excellent cycle characteristic and excellent thermal stability by higher crystallinity. Note that, an upper limit of the crystallite diameter is not particularly limited, but it is preferable that the upper limit is 1500 Å if using a production method described below for the positive electrode active material represented by General Formula described above.

When the element M is not added, it is not possible to obtain an effect of improving battery characteristic by high crystallinity. In addition, in order to sufficiently obtain the effect of improving the battery characteristic, it is preferable that y is 0.01 or more.

z indicating the content of lithium (Li) is $0.95\leq z\leq1.03$.

When z is less than 0.95, a metal element such as Ni is mixed into the lithium layer in the layered compound, thus decreasing insertion/extraction properties of Li. This causes a decrease in the battery capacity and degradation in output characteristic. On the other hand, when z is greater than 1.03, Li is mixed into the metal layer in the layered compound, thus deceasing the battery capacity.

Therefore, the content of lithium in the lithium nickel composite oxide of the positive electrode active material of the present invention is $0.95\leq z\leq1.03$, and more preferably $0.95\leq z\leq1.01$, in order to have excellent battery capacity and excellent output characteristic.

[Compound Containing Al and Li]

In general, if the surface of the positive electrode active material is completely coated with a heterologous compound, the movement (the intercalation) of lithium ions is greatly restricted As a result, the advantage of a high capacity of the lithium nickel composite oxide cannot be obtained.

In contrast, in the present invention, a compound containing aluminum (Al) and lithium (Li) (hereinafter, also referred to as the LiAl compound) is formed on the surfaces of the primary particles of the lithium nickel composite oxide. Such a compound has high lithium ion conductivity and has an effect of promoting the movement of the lithium ions. For this reason, a conduction path of Li is formed on the interface with respect to an electrolyte solution by forming such compounds on the surfaces of the primary particles. Thus, reaction resistance of the active material is reduced, and the output characteristic is improved.

Here, when the surfaces of lithium nickel composite oxide particles are coated with a layered material, a specific surface area decreases regardless of a coating thickness thereof. Thus, even if a coated material has high lithium ion conductivity, a contact area with respect to the electrolyte solution is decreased. Therefore, a decrease in a charge and discharge capacity and an increase in the reaction resistance easily occur.

However, if the LiAl compound of the present invention is formed, lithium ion conduction can be effectively improved, because the contact area with respect to the electrolyte solution is regarded as sufficient. Thus, it is possible to suppress a decrease in the charge and discharge capacity and to reduce the reaction resistance.

It is preferable that the LiAl compound is in a particulate form and the compound is formed to cover the surfaces of the lithium nickel composite oxide particles. Further, since the compound is in a particulate form, it is possible to ensure a sufficient contact area between the lithium nickel composite oxide particles and the electrolyte solution.

It is preferable that the LiAl compound in a particulate form has a particle size of 1 nm to 100 nm. When the particle size is less than 1 nm, sufficient lithium ion conductivity may not be attained. In addition, this is because iwhen the particle size is greater than 100 nm, the coating may be non-uniformly formed, and an effect of reducing the reaction resistance may not be sufficiently obtained.

In addition, the positive electrode active material of the present invention is configured of the primary particles and the secondary particles configured by aggregating the primary particles. Note that, the primary particles and the secondary particles configured by aggregating the primary particles include not only a form where the primary particles and the secondary particles are mixed, but also a form where only the primary particles are provided or a form where only the secondary particles are provided. Further, the contact between the lithium nickel composite oxide particles and the electrolyte solution occurs on the surfaces of the primary particles. Thus, it is important that the LiAl compound is formed on the surfaces of the primary particles.

The surfaces of the primary particles include the surfaces of the primary particles that are exposed to the outer surfaces of the secondary particles and the surfaces of the primary particles that are exposed to voids in the vicinity of the surfaces of the secondary particles and inside the secondary particles into which the electrolyte solution can be infiltrated through the outside of the secondary particles. Further, the surfaces of the primary particles also include a grain boundary between the primary particles insofar as a bond between the primary particles is incomplete, and thus, the electrolyte solution can be infiltrated. That is, the surfaces of the primary particles indicate all of the surfaces of the primary particles that can be in contact with the electrolyte solution.

Therefore, by forming the LiAl compound on all of the surfaces of the primary particles, it is possible to further promote the movement of the lithium ions, and to further reduce the reaction resistance of the lithium nickel composite oxide particles.

In addition, it is not necessary that the LiAl compound is completely formed on all of the surfaces of the primary particles, but the LiAl compound may be scattered. Even in the scattered state, the effect of reducing the reaction resistance is obtained insofar as the LiAl compound is formed on the surfaces of the primary particles of the lithium nickel composite oxide particles.

The properties of such surfaces of the primary particles can be determined by being observed, for example, with a field emission scanning electron microscope, and it is found that, in the positive electrode active material for non-aqueous electrolyte secondary batteries of the present invention, the AlLi compound is formed on the surfaces of the primary particles formed of the lithium nickel composite oxide.

On the other hand, when the compound is non-uniformly formed between the lithium nickel composite oxide particles, the movement of the lithium ions between the particles is non-uniform. Thus, a load is applied to specific composite oxide particles, and the degradation of the cycle characteristic and an increase in the reaction resistance easily occur. Therefore, it is preferable that the compound is uniformly formed between the lithium nickel composite oxidation particles.

In the present invention, this compound may contain Al and Li, and it is preferable that Al and Li are in the form of at least one type selected from $LiAl_2(OH)_7 \cdot xH_2O$, $LiH(AlO_2)_2 \cdot 5H_2O$, and $LiAlO_2$.

The LiAl compound is formed in a particulate form with a particle size of 1 nm to 100 nm. thus further increasing the lithium ion conductivity and further enhancing an effect of reducing the reaction resistance.

It is preferable that an aluminum amount contained in the LiAl compound is 0.01 atom % to 0.50 atom % with respect to the total number of atoms of Ni, Co, and M contained in the lithium nickel composite oxide particles. Accordingly, it is possible to make a high charge and discharge capacity and high output characteristic compatible.

When the aluminum amount contained in the LiAl compound is less than 0.01 atom %, an effect of improving the output characteristic may not be sufficiently obtained. When the aluminum amount is greater than 0.50 atom %, the LiAl compound formed on the surfaces of the primary particles excessively increases, lithium conduction between the lithium nickel composite oxide particles and the electrolyte solution is hindered, and the charge and discharge capacity may decrease.

In addition, a lithium amount contained in the LiAl compound is not particularly limited. However, the effect of improving the lithium ion conductivity is obtained insofar as lithium is contained in the obtained compound, and it is preferable that the lithium amount is sufficient to form the LiAl compound.

[Physical Property Value of Average Particle Size and Others]

It is preferable that the positive electrode active material of the present invention contains the lithium nickel composite oxide particles described above, and an average particle size thereof is 8 µm to 20 µm.

When the average particle size is less than 8 µm, the filling properties of the positive electrode decrease when used as the positive electrode active material of the batteries, and the battery capacity per a volume may decrease. On the other hand, when the average particle size is greater than 20 µm, the contact area between the positive electrode active material and the electrolyte solution of the batteries is decreased, and the battery capacity or the output characteristic may decrease.

Therefore, the positive electrode active material of the present invention increases the filling properties of the positive electrode while maintaining the battery capacity or the output characteristic. Thus, the average particle size is preferably 8 µm to 20 µm, and is more preferably 8 µm to 17 µm.

Note that, the "average particle size" in the present invention is represented by an average particle size MV based on a volume that is measured by a laser diffraction scattering method.

In the positive electrode active material of the present invention, composite oxide particles that are a base material are formed of the primary particles and the secondary particles configured by aggregating the primary particles. By adopting such a particle structure, the contact with respect to the electrolyte solution described above occurs not only on the outer surfaces of the secondary particles configured by aggregating the primary particles, but also in the voids in the vicinity of the surfaces of the secondary particles and inside the secondary particles, and further in an incomplete grain boundary.

In order to attain such contact with respect to the electrolyte solution, the average particle size of the composite oxide particles according to the present invention is 8 µm to 20 µm. In the range of the average particle size, it is possible to make the contact with respect to the electrolyte solution and the filling properties compatible.

In addition, a specific surface area of the positive electrode active material that is measured by a BET method is preferably in a range of 0.4 $m^2$/g to 1.2 $m^2$/g, and is more preferably in a range of 0.4 $m^2$/g to 1.0 $m^2$/g.

By having such a specific surface area, it is possible to provide the contact with respect to the electrolyte solution in a suitable range, and to further increase the battery capacity or the output characteristic. However, when the specific surface area is less than 0.4 $m^2$/g, the contact with respect to the electrolyte solution may excessively decrease. When the specific surface area is greater than 1.2 $m^2$/g, the contact with respect to the electrolyte solution excessively increases. Thus, the thermal stability may decrease.

Further, in the observation of sectional surfaces of the secondary particles described above, a void ratio to be measured is preferably 0.5% to 4.0%, and is more preferably 0.7% to 3.5%.

Accordingly, it is possible to sufficiently infiltrate the electrolyte solution into the secondary particles, and to further increase the battery capacity or the output characteristic. On the other hand, if the void ratio is greater than 4.0%, the crystallinity is insufficient, and the reaction resistance may increase.

Here, the void ratio can be measured by observing an arbitrary sectional surface of the secondary particles with a scanning electron microscope, and by performing image analysis.

For example, a plurality of secondary particles are embedded in a resin or the like, and sectional surfaces of the particles are set in a state where they can be observed by a cross sectional polishing process or the like. After this, in 20 or more arbitrary secondary particles by "Image Analysis Software: WinRoof 6.1.1" or the like, the total area of all particles is measured by setting voids in the secondary particles to black, and by setting dense portions in the outline of the secondary particles to white, and an area ratio of [Black Portion/(Black Portion+White Portion)] is calculated, thereby enabling to obtain the void ratio.

(2) Production Method for Positive Electrode Active Material

Hereinafter, a production method for a positive electrode active material for non-aqueous electrolyte secondary batteries of the present invention will be described in detail for each process.

The production method for a positive electrode active material of the present invention includes processes of (A) to (D) described below in the order of the processes of (A) to (D).

(A) Firing Process

A firing process is a process of firing a lithium mixture in which the nickel compound and the lithium compound are mixed in a temperature range of 720° C. to 770° C. in an oxidizing atmosphere such as an oxygen atmosphere, and of preparing a fired powder of the lithium nickel composite oxide that is represented by at least General Formula: $Li_zNi_{1-x-y}Co_xM_yO_2$ (here, $0.98 \leq z \leq 1.05$, $0 < x \leq 0.20$, $0 < y \leq 0.10$, $x+y \leq 0.20$, and M is at least one type of element selected from Mg, Al, Ca, Ti, V, Cr, Mn, Nb, Zr, and Mo) and contains the primary particles and the secondary particles configured by aggregating the primary particles.

[Nickel Compound]

The nickel compound that is used in the firing process is a compound containing nickel, cobalt, and an element represented by M in General Formula described above.

For example, a nickel composite hydroxide or a nickel oxy composite hydroxide can be used as the nickel compound. In addition, a nickel composite oxide that is obtained by roasting the nickel composite hydroxide or the nickel oxy composite hydroxide can also be used as the nickel compound that is a raw material of the firing process.

The nickel composite hydroxide that is used as the nickel compound is not particularly limited. For example, a nickel composite hydroxide obtained by a crystallization method such as a coprecipitation method and a homogeneous precipitation method can be used.

In the crystallization method, the nickel composite hydroxide is obtained in various conditions, and a crystallization condition thereof is not particularly limited, but it is preferable that the nickel composite hydroxide is obtained in the following conditions.

Specifically, preferred is a nickel composite hydroxide obtained by dropping an aqueous solution of a metal compound containing nickel, cobalt, and the element represented by the M, and an aqueous solution containing an ammonium ion feeder, into a reaction tank that is warmed at 40° C. to 60° C.

In particular, preferred is a nickel composite hydroxide that is prepared by dropping an aqueous solution of an alkaline metal hydroxide, as necessary, such that a reaction solution can be retained to be alkaline, preferably, at a pH value of 10 to 14 at a liquid temperature of 25° C.

Note that, the element represented by the M may be coprecipitated with nickel and cobalt. However, after a hydroxide is obtained by crystallization, it is coated with the metal compound containing the element represented by the M or impregnated in an aqueous solution containing the metal compound, thereby obtaining the nickel composite hydroxide.

The nickel composite hydroxide obtained by the crystallization method described above is a powder having a high bulk density.

Further, such a composite hydroxide having a high bulk density is washed with water after the firing process, and the lithium nickel composite oxide particles having a small specific surface area are easily obtained. Thus, it is possible to obtain the nickel composite hydroxide suitable as the raw material of the lithium nickel composite oxide that is used as the positive electrode active material for non-aqueous electrolyte secondary batteries.

When the nickel hydroxide is crystallized in a state where the temperature of the reaction solution is higher than 60° C. or the pH is greater than 14, the priority of nuclear generation in the liquid increases, and only a fine powder may be obtained without crystal growth. On the other hand, when the nickel composite hydroxide is crystallized in a state where the temperature is lower than 40° C. or the pH is less than 10, less nuclei are generated in the liquid, the crystal growth of the particles is preferentially performed, and coarse particles may be mixed into the nickel composite hydroxide to be obtained. In addition, a remaining amount of metal ions in the reaction liquid increases, and a compositional deviation may occur.

When using the nickel composite hydroxide in which the coarse particles are mixed or the compositional deviation occurs, as the raw material, the battery characteristic of the obtained positive electrode active material decreases.

Therefore, in the firing process, when the nickel composite hydroxide that is used as the nickel compound is obtained by the crystallization method, it is preferable that the crystallization is performed in a state the reaction solution is maintained at 40° C. to 60° C., and the reaction solution is maintained at a pH value of 10 to 14 at a reference liquid temperature of 25° C.

In the firing process, the nickel oxy composite hydroxide can be used as the nickel compound. A method of obtaining a nickel oxyhydroxide is not particularly limited, but it is preferable to prepare the nickel oxyhydroxide by oxidizing the nickel composite hydroxide with an oxidant such as sodium hypochlorite and hydrogen peroxide water. The nickel oxy composite hydroxide that is obtained by the method is a powder having a high bulk density.

Such a nickel oxy composite hydroxide having a high bulk density is washed with water after the firing process. Then, the lithium nickel composite oxide particles having a small specific surface area are easily obtained. Thus, the nickel oxy composite hydroxide suitable as the raw material of the lithium nickel composite oxide is obtained. This oxide is used as the positive electrode active material for non-aqueous electrolyte secondary batteries.

In addition, in the firing process, the nickel composite oxide can also be used as the nickel compound.

A method of obtaining a nickel composite oxide is not particularly limited. However, it is preferable to prepare the nickel composite oxide by performing oxidation roasting with respect to the nickel composite hydroxide or the nickel oxy composite hydroxide described above in an oxidizing atmosphere, at a temperature of 500° C. to 750° C., and more preferably at a temperature of 550° C. to 700° C. Note that, a mixture of the nickel composite oxide and the nickel oxy composite hydroxide described above may be oxidation roasted.

When using the nickel composite oxide obtained as described above, it is possible to stabilize a composition ratio of Li and metals other than Li in the lithium nickel composite oxide, at the time of obtaining the lithium nickel composite oxide by firing a mixture mixed with the lithium compound. Then, it is possible to attain an advantage of the enlargement in capacity and high output at the time of using the lithium nickel composite oxide as the positive electrode active material.

Here, when an oxidation roasting temperature is lower than 500° C. at the time of performing the oxidation roasting with respect to the nickel composite hydroxide or the nickel oxy composite hydroxide, the transition of the nickel composite hydroxide or the like to the oxide may be incomplete.

In the lithium nickel composite oxide that is obtained by using the nickel composite oxide in which the transition to the oxide is incomplete, it is difficult to stabilize the composition, and the composition is likely to be heterogenized when firing.

In addition, if the nickel composite hydroxide and the like remain in the nickel composite oxide after the oxidation roasting, water vapor is generated when firing, and a reaction between the lithium compound and the nickel composite oxide is hindered, resulting in a problem of decreasing the crystallinity.

On the other hand, if the oxidation roasting temperature is higher than 750° C., the crystallinity of the nickel composite oxide to be obtained increases, and reactivity between the lithium compound and the nickel composite oxide when firing in the subsequent process decreases. Thus, the crystallinity of the lithium nickel composite oxide that is finally obtained may decrease.

In addition, the nickel composite oxide rapidly causes grain growth, and coarse nickel composite oxide particles are formed. Thus, there is a possibility of excessively increasing the average particle size of the lithium nickel composite oxide obtained by mixing and firing the lithium compound.

Therefore, when obtaining the nickel composite oxide by performing the oxidation roasting with respect to the nickel composite hydroxide or the nickel oxy composite hydroxide in an oxidizing atmosphere, the oxidation roasting is performed, preferably at a temperature of 500° C. to 750° C., and more preferably at a temperature of 550° C. to 700° C.

In addition, a retention time at the oxidation roasting temperature is preferably 1 hour to 10 hours, and is more preferably 2 hours to 6 hours. If the retention time is shorter than 1 hour, the transition to the oxide may be incomplete, and if the retention time is longer than 10 hours, the crystallinity of the nickel composite oxide may excessively increase.

The atmosphere of the oxidation roasting may be an oxidizing atmosphere, and it is preferable that the atmosphere of the oxidation roasting is the atmosphere, in consideration of handleability or costs.

In the nickel composite hydroxide that is used as the nickel compound, the content of a sulfate radical ($SO_4^{2-}$) is preferably 0.1 mass % to 0.4 mass %, and is more preferably 0.1 mass % to 0.3 mass %. Accordingly, in the firing of the subsequent process, the crystallinity of the lithium nickel composite oxide is easily controlled.

That is, the shrinkage of the secondary particles due to the growth of the primary particles when firing can be moderate by setting the content of the sulfate radical to 0.1 mass % to 0.4 mass %. Thus, it is also possible to easily control the void ratio.

However, if the content of the sulfate radical is less than 0.1 mass %, the progress of crystallization is excessively fast, and thus, the primary particles grow, the shrinkage of the secondary particles increases, and the specific surface area or the void ratio excessively decreases. On the other hand, if the content of the sulfate radical is greater than 0.4 mass %, the growth of the primary particles is suppressed, and thus, the specific surface area or the void ratio excessively increases.

In addition, the nickel oxy composite hydroxide obtained from the nickel composite hydroxide and the nickel composite oxide contain approximately the equivalent amount of sulfate radical to that of the sulfate radical contained in the nickel composite hydroxide.

Therefore, the content of the sulfate radical ($SO_4^{2-}$) of the nickel composite hydroxide is set to 0.1 mass % to 0.4 mass %. Thus, even when obtaining the active material by using the nickel oxy composite hydroxide obtained from the nickel composite hydroxide or the nickel composite oxide, as the raw material, the same effect can be obtained.

A nickel composite hydroxide obtained by a crystallization method is preferable as the nickel composite hydroxide described above. At this time, it is preferable that a sulfate such as nickel sulfate is used as the raw material, and washing is sufficiently performed after the crystallization, thereby obtaining a nickel composite hydroxide containing 0.1 mass % to 0.4 mass % of the sulfate radical.

Further, it is preferable that the washing is performed by using an alkaline aqueous solution of which the pH is adjusted to 11 to 13 at a liquid temperature of 25° C. If the pH of the alkaline aqueous solution is less than 11, the content of the sulfate radical may not possibly be reduced to 0.1 mass % to 0.4 mass %. Even if the pH of the alkaline aqueous solution is greater than 13, there is a concern that not only is an effect of reducing the sulfate radical not improved, but also cations in the alkaline aqueous solution remain as impurities.

An aqueous solution of an alkaline metal hydroxide such as sodium hydroxide, and a carbonate such as sodium carbonate is preferably used as the alkaline aqueous solution. It is preferable to perform water washing after the washing with the alkaline aqueous solution.

[Mixing with Lithium Compound]

The lithium compound that is mixed with the nickel compound is not particularly limited. However, it is preferable that at least one type selected from the group consisting of a hydroxide, an oxyhydroxide, an oxide, a carbonate, a nitrate, and a halide of lithium is used as the lithium compound.

An advantage of using such a lithium compound is that the impurities do not remain after firing. It is more preferable to use the hydroxide of lithium having excellent reactivity with respect to the nickel compound.

A mixing ratio of the nickel compound and the lithium compound is not particularly limited. However, the composition of lithium and metal elements other than lithium in the lithium nickel composite oxide after firing is maintained to be approximately the same as the composition in the mixture obtained by mixing the nickel compound and the lithium compound.

Therefore, it is preferable that the lithium amount in the lithium compound is adjusted to a molar ratio of 0.98 to 1.05 with respect to total amount of nickel and the other metal elements in the nickel compound.

When the molar ratio is less than 0.98, the crystallinity of the fired powder to be obtained may be extremely degraded. In addition, the content of lithium in the fired powder to be obtained may be less than 0.98.

On the other hand, when the molar ratio is greater than 1.05, the firing is easily performed and over-firing easily occurs, and there is a possibility that the content of lithium in the fired powder to be obtained is also greater than 1.05.

A device or a method for mixing the nickel compound and the lithium compound is not particularly limited insofar as both of the nickel compound and the lithium compound can be uniformly mixed. For example, a dry mixer such as a V blender, a mixing and granulating device, or the like can be used.

[Firing]

The lithium mixture in which the nickel compound and the lithium compound are mixed is fired in a temperature range of 720° C. to 770° C., and preferably in a temperature range of 730° C. to 760° C., in an oxidizing atmosphere.

When the firing is performed at a temperature of higher than 500° C., the lithium nickel composite oxide is generated, but the crystals of the lithium nickel composite oxide are not fully developed at a temperature of lower than 700° C., and thus, the lithium nickel composite oxide is structurally unstable. When using such a lithium nickel composite oxide as the positive electrode active material, a crystal structure of the positive electrode active material is easily fractured due to phase transition according to charge and discharge. In addition, the growth of the primary particles is also insufficient, and the specific surface area or the void ratio may excessively increase.

On the other hand, if the firing is performed at a temperature of higher than 770° C., the crystallite diameter is greater than 1500 Å, the cation mixing easily occurs, a layered structure in the crystals of the lithium nickel composite oxide collapses, and there is a possibility that it is difficult to perform the insertion and de-insertion of the lithium ions. Furthermore, the crystals of the lithium nickel composite oxide are disaggregated, and there is a possibility that nickel oxide and the like are generated.

In addition, the composite oxide particles cause sintering, coarse composite oxide particles are formed, and the average particle size of the lithium nickel composite oxide may excessively increase. Further, the primary particles grow, and the specific surface area or the void ratio may excessively decrease.

Therefore, the lithium mixture is fired at a firing temperature that is in a temperature range of 720° C. to 770° C., and preferably in a temperature range of 730° C. to 760° C. Further, it is preferable to perform the firing such that the crystallite diameter that is calculated from the peak of the (003) surface in the X-ray diffraction (XRD) is 1400 Å or more.

In addition, a retention time at the firing temperature is preferably 1 hour to 6 hours, and is more preferably 2 hours to 4 hours. If the retention time is shorter than 1 hour, the crystallization is insufficient, a positive electrode active material having high crystallinity may not be obtained. If the retention time is longer than 6 hours, the firing is excessively performed, and the cation mixing may occur.

In particular, it is particularly preferable that the firing is performed in two stages of performing the firing at a temperature of 400° C. to 600° C. for 1 hour to 5 hours, and then, of performing the firing at a temperature of 720° C. to 770° C. for 3 hours or longer, such that crystalline water or the like in the lithium compound can be removed, and a uniform reaction is performed in a temperature range in which the crystal growth of the lithium nickel composite oxide is performed.

In the firing, the lithium nickel composite oxide can be synthesized in the oxidizing atmosphere, a mixed gas atmosphere of 18 capacity % or more of oxygen and inert gas or an oxygen atmosphere (an oxygen concentration of 100 capacity %) is preferable, a mixed gas atmosphere of an oxygen concentration of 90 capacity % or more or the oxygen atmosphere is more preferable.

If the firing is performed in an atmosphere where the oxygen concentration is 18 capacity % or more, that is, the oxygen content is greater than that in the atmosphere, it is possible to increase the reactivity between the lithium compound and the nickel compound.

In order to obtain a lithium nickel composite oxide having excellent crystallinity by further increasing the reactivity, the mixed gas atmosphere of the oxygen concentration of 90 capacity % or more is more preferable, and the oxygen atmosphere is even more preferable.

A device or a method for firing the lithium mixture is not particularly limited. For example, a firing furnace such as an electric furnace, a kiln, a tubular furnace, and a pusher furnace that can be adjusted to a gas atmosphere of an oxygen concentration of 18 capacity % or more, such as an oxygen atmosphere and a dry air atmosphere in which dehumidification and a decarbonation treatment are performed.

As described above, the fired powder of the lithium nickel composite oxide that is represented by at least General Formula: $Li_zNi_{1-x-y}Co_xM_yO_2$ (here, $0.98 \leq z \leq 1.05$, $0 < x \leq 0.20$, $0 < y \leq 0.10$, $x+y \leq 0.20$, and M is at least one type of element selected from Mg, Al, Ca, Ti, V, Cr, Mn, Nb, Zr, and Mo) and contains the primary particles and the secondary particles configured by aggregating the primary particles is prepared.

When the positive electrode active material that is obtained from the fired material is used in the positive electrode of the batteries, it is possible to maintain the thermal stability or the like, and to attain the enlargement of capacity or high output by facilitating the insertion and de-insertion of the lithium ions.

Here, if z indicating the content of lithium in the fired powder is less than 0.98, the crystallinity of the fired powder decreases, and in the lithium nickel composite oxide after a water washing process, the molar ratio of lithium and metals other than lithium is less than 0.95. Thus, a large decrease occurs in the battery capacity at charge and discharge cycles.

On the other hand, when z is greater than 1.05, a large amount of excessive lithium compounds remains on the surface of the fired powder, and thus, it is difficult to remove the remaining compounds with the water washing. When using the positive electrode active material in which the excessive lithium compound is insufficiently removed, not only is a large amount of gas generated when the battery is charged, but also a problem is caused in which the positive electrode active material reacts with a material such as an organic solvent used at the time of preparing the electrode since the positive electrode active material is a powder indicating high pH, and thus, a slurry is gelated. Further, when the content of lithium in the lithium nickel composite oxide of the positive electrode active material is greater than 1.03, and the positive electrode active material to be obtained is used as the positive electrode active material of the batteries, the battery capacity decreases, and internal resistance of the positive electrode increases.

Descriptions have been provided for a case where the nickel compound in which metal elements other than lithium are solid-solved or dispersed by the crystallization method, and the lithium compound are mixed and fired as the raw material, as a method of obtaining the fired powder of the lithium nickel composite oxide.

However, the method of obtaining the fired powder is not particularly limited. Examples of the method of obtaining the fired powder include a method of performing a spray pyrolysis treatment with respect to a liquid mixed with all aqueous solutions containing desired metal elements, and a method of pulverizing and mixing all compounds of desired metal elements by mechanical pulverization such as ball mill, and then, of performing firing. However, in order to obtain a positive electrode active material having a small specific surface area and excellent thermal stability, it is preferable to obtain the fired powder of the lithium nickel composite oxide by the method described above.

(B) Water Washing Process

A water washing process is a process of performing the water washing treatment with respect to the fired powder of the lithium nickel composite oxide that is obtained in the firing process.

Specifically, a slurry is formed such that the amount of fired powder is 1000 g to 2000 g with respect to 1 L of water, and is washed with water, and then filtered, to obtain a cake of a lithium nickel composite oxide powder (a water washed powder) in a wet state (hereinafter, also referred to as a cleaned cake).

In the water washing process, a water washing temperature during the water washing treatment is adjusted to preferably 10° C. to 40° C., and more preferably 20° C. to 30° C.

Since the temperature is adjusted as described above, impurities existing on the surface of the fired powder of the lithium nickel composite oxide can be removed, and the residual lithium amount of lithium carbonate lithium hydroxide or the like existing on the surface can be 0.10 mass % or less with respect to the total powder. Accordingly, when using the positive electrode active material to be obtained in the positive electrode of the batteries, it is possible to suppress gas generation at the time of being retained at a high temperature, and to make a high capacity, high output, and high safety compatible.

In contrast, when the water washing temperature is lower than 20° C., it is not possible to sufficiently wash the fired powder, and a large amount of impurities attached onto the surface of the fired powder may remain without being removed. When the impurities remain on the surface of the fired powder as described above, the resistance of the surface of the positive electrode active material to be obtained increases Thus, when the positive electrode active material is used in the positive electrode of the batteries, a resistance value of the positive electrode increases. Furthermore, the specific surface area of the positive electrode active material excessively decreases, and the reactivity with respect to the electrolyte solution decreases. When the positive electrode active material is used in the positive electrode of the batteries, it is difficult to attain the enlargement of capacity or high output. Further, the residual lithium amount existing on the surface of the composite oxide particles is greater than 0.10 mass %, and the gas generation is more likely to occur at the time of being stored at a high temperature when used as the batteries.

On the other hand, if the water washing temperature is higher than 40° C., an elution amount of lithium from the fired powder increases, and there is a concern than nickel oxide (NiO) from which Li is removed or nickel oxyhydroxide (NiOOH) in which Li is substituted with H is generated on a surface layer. Both of the nickel oxide (NiO) and the nickel oxyhydroxide (NiOOH) have a high electric resistance. Thus, the resistance of the composite oxide particles surface increases, Li of the lithium nickel composite oxide decreases, and the capacity decreases.

In the water washing described above, the slurry is formed by mixing water and the fired powder, and the fired powder is washed by stirring the slurry. At this time, the amount (g) of fired powder contained in the slurry with respect to 1 L of water is adjusted to 1000 g to 2000 g, and preferably 1200 g to 1500 g.

That is, the amount of fired powder in the slurry increases as a slurry concentration increases If the slurry concentration is greater than 2000 g/L, the viscosity of the slurry increases, it is difficult to stir the slurry. Furthermore, an alkali concentration in the liquid of the slurry increases, and thus, a dissolving rate of an attachment that is attached to the fired powder decreases, based on the equilibrium relationship. Even if the attachment is peeled off from the powder, the attachment may be attached again to the powder. Thus, it is difficult to remove the impurities.

On the other hand, if the slurry concentration is less than 1000 g/L, the slurry is excessively sparse. Thus, the amount of lithium that is eluted into the slurry from the surface of each of the particles increases. In particular, the elution amount of lithium increases as a nickel ratio increases, and the lithium amount on the surface decreases. For this reason, the de-insertion of lithium from a crystal lattice of the lithium nickel composite oxide also occurs, and thus, the crystal easily collapses. Therefore, when the obtained positive electrode active material is used in the positive electrode of the batteries, the battery capacity decreases.

In addition, the time for performing the water washing with respect to the fired powder is not particularly limited, but it is preferably approximately 5 minutes to 60 minutes. If a water washing time is short, the impurities on the surface of the powder may remain without being sufficiently removed. On the other hand, even if the water washing time is elongated, a washing effect is not improved, and productivity decreases.

Water for use in forming the slurry is not particularly limited, but in order to prevent a decrease in battery performance due to the attachment of the impurities with respect to the positive electrode active material, water having an electric conductance rate of less than 10 μS/cm is preferable, and water having an electric conductance rate of 1 μS/cm or less is more preferable.

(C) Aluminum Adding Process

An aluminum (Al) adding process is a process of mixing an aluminum compound power to the cleaned cake in the wet state that is obtained in the water washing process to obtain a mixture of the lithium nickel composite oxide particles configuring the cleaned cake and the aluminum compound powder (hereinafter, simply referred to as a mixture).

The aluminum compound to use is infiltrated into not only the surfaces of the primary particles exposed to the outer surfaces of the secondary particles of the lithium nickel composite oxide particles, but also the grain boundary between the primary particles configuring the secondary particles or the surfaces of the primary particles in the secondary particles, that is, surfaces of the primary particles that can be in contact with the electrolyte solution. Thus, it is preferable that the aluminum compound is a compound that can be dissolved in an alkaline aqueous solution containing lithium in which the mixture is retained.

In addition, the mixture is heated in a thermal treatment process that is the subsequent process. Thus, even when it is difficult to dissolve the mixture in the alkaline aqueous solution at a normal temperature, the mixture may be dissolved in the alkaline aqueous solution by being warmed during a thermal treatment, or may be dissolved by reacting with the lithium compound on the surfaces of the lithium nickel composite oxide particles, and by forming the LiAl compound. Further, it is sufficient that the amount of LiAl compound that is dissolved is an amount that can be infiltrated into the surfaces of the primary particles in the secondary particles. Thus, a part of the LiAl compound may be in a solid state after being mixed and heated.

As described above, the aluminum compound does not contain lithium, and it may be in a state where the aluminum compound can be dissolved in the alkaline aqueous solution containing lithium at the time of being heated in the thermal treatment process, and aluminum hydroxide, aluminum oxide, and the like are preferable.

An aluminum compound in an arbitrary form such a powder or gel can be used as the aluminum compound. An average particle size of an aluminum compound powder is preferably 10 nm to 1 μm. In such a range, the aluminum compound powder can be easily dissolved in the alkaline aqueous solution containing lithium.

Further, an aluminum amount that is contained in the mixture as the aluminum compound is preferably 0.01 atom % to 0.50 atom %, is more preferably 0.02 atom % to 0.30 atom %, and is even more preferably 0.05 atom % to 0.20 atom %, with respect to the total number of atoms of Ni, Co, and the M contained in the lithium nickel composite oxide particles.

Accordingly, it is possible to set the aluminum amount derived from the aluminum compound contained in the LiAl compound of the positive electrode active material after the thermal treatment process to be in a preferred range, and to make a high charge and discharge capacity and the output characteristic positive electrode active material more compatible.

In addition, it is preferable that the cleaned cake and the aluminum compound are mixed at a temperature of 50° C. or lower. If the temperature is higher than 50° C., a water amount in the mixture that is necessary for prompting a reaction between the lithium compound and the aluminum compound may not be obtained due to drying during mixing.

A general mixer can be used at the time of mixing the cleaned cake of the lithium nickel composite oxide with the aluminum compound. For example, the cake and the compounds may be sufficiently mixed by using a shaker mixer, a Loedige mixer, a Julia mixer, a V blender, and the like to the extent that the skeleton of the lithium nickel composite oxide is not fractured.

(D) Thermal Treatment Process

A thermal treatment process is a process of forming the AlLi compound on the surfaces of the primary particles of the lithium nickel composite oxide by performing a thermal treatment with respect to the lithium nickel composite oxide in which aluminum is dispersed on the surfaces of the primary particles. Accordingly, the AlLi compound is formed from aluminum that is supplied in the aluminum adding process, and lithium that is derived from the lithium nickel composite oxide. Thus, it is possible to obtain the positive electrode active material for non-aqueous electrolyte secondary batteries containing the AlLi compound on the surfaces of the primary particles of the lithium nickel composite oxide.

The thermal treatment method is not particularly limited. However, in order to prevent the degradation of electric characteristic at the time of being used as the positive electrode active material for non-aqueous electrolyte secondary batteries, it is preferable that the thermal treatment is performed at a temperature of 100° C. to 600° C. in an oxygen atmosphere or a vacuum atmosphere.

If a thermal treatment temperature is lower than 100° C., water is not sufficiently evaporated. Thus, the compound may not be sufficiently formed. On the other hand, if the thermal treatment temperature is higher than 600° C., the primary particles of the lithium nickel composite oxide causes sintering, and a part of aluminum is solid-solved in the layered structure of the lithium nickel composite oxide. Thus, the charge and discharge capacity of the batteries may decrease. In order to suppress such a decrease in the charge and discharge capacity of the batteries, it is more preferable to set the thermal treatment temperature to 550° C. or lower, and it is even more preferable to set the thermal treatment temperature to 500° C. or lower.

It is preferable that the atmosphere of the thermal treatment is an oxidizing atmosphere such as an oxygen atmosphere, or a vacuum atmosphere, in order to prevent a reaction with respect to water or a carbonic acid in the atmosphere.

A thermal treatment time is not particularly limited, but it is preferable that the thermal treatment time is 5 hours to 15 hours, in order to form the compound by sufficiently evaporating water in the composite oxide particles.

The thermal treatment is performed by mixing the aluminum compound with the lithium nickel composite oxide particles as described above. By so doing, the LiAl compound that is formed on the surfaces of the lithium nickel composite oxide particles is likely to be in a particulate form. Since the compounds are in a particulate form, it is possible to ensure a sufficient contact area between the lithium nickel composite oxide particles and the electrolyte solution. It is preferable that a particle size of the LiAl compound in a particulate form is 1 nm to 100 nm.

In addition, the lithium nickel composite oxide particles are configured of the primary particles and the secondary particles in which the primary particles are aggregated. As described above, the contact between the lithium nickel composite oxide particles and the electrolyte solution occurs on the surfaces of the primary particles. Thus, it is important that the LiAl compound is formed on the surfaces of the primary particles. Here, the surfaces of the primary particles include the surfaces of the primary particles that are exposed to the outer surfaces of the secondary particles and also the surfaces of the primary particles that are exposed to voids in the vicinity of the surfaces of the secondary particles and inside thereof into which the electrolyte solution can be infiltrated through the outside of the secondary particles. Further, the surfaces of the primary particles also include a grain boundary between the primary particles insofar as a bond between the primary particles is incomplete, and thus, the electrolyte solution can be infiltrated. That is, the surfaces of the primary particles indicate all of the surfaces of the primary particles that can be in contact with the electrolyte solution. Accordingly, in the lithium nickel composite oxide particles, it is preferable that the particulate LiAl compound is formed on the surfaces of the primary particles that can be in contact with the electrolyte solution.

A moisture content of the composite oxide particles after drying is not particularly limited, but is preferably 0.2 mass % or less, and is more preferably 0.1 mass % or less.

If the moisture content of the powder is greater than 0.2 mass %, a gas component containing carbon and sulfur in the atmosphere is absorbed, and thus, the lithium compound may be generated on the surface. Note that, a measured value of the moisture content described above is a measured value when the moisture content is measured by a Karl Fischer moisture meter in a condition of a gasification temperature of 300° C.

When aggregation occurs in the composite oxide particles after the thermal treatment, crushing is performed to the extent that the skeleton of the secondary particles is not fractured, and thus, a positive electrode active material formed of composite oxide particles having an average particle size of 8 μm to 20 μm is prepared.

(3) Non-Aqueous Electrolyte Secondary Battery

The positive electrode is prepared by using the positive electrode active material formed of the lithium nickel composite oxide described above, in particular, by using the lithium nickel composite oxide obtained by the production method described above as the positive electrode active material. Then, the non-aqueous electrolyte secondary batteries of the present invention is prepared by using this positive electrode, and has a high capacity, high output, and high safety.

Hereinafter, the structure of the non-aqueous electrolyte secondary batteries of the present invention will be described.

The non-aqueous electrolyte secondary batteries of the present invention (hereinafter, simply referred to as secondary batteries) have a structure that is substantially equivalent to that of general non-aqueous electrolyte secondary batteries, except that the positive electrode active material for non-aqueous electrolyte secondary batteries of the present invention (hereinafter, simply referred to as the positive electrode active material) is used in the material of the positive electrode.

Specifically, the secondary batteries of the present invention have a structure including a case, a positive electrode, a negative electrode, a non-aqueous electrolyte solution, and a separator that are contained in the case.

More specifically, an electrode element is obtained by laminating the positive electrode and the negative electrode through the separator. The obtained electrode element is impregnated in the non-aqueous electrolyte solution. A collection lead or the like is used for connecting: between a positive electrode collector of the positive electrode and a positive electrode terminal leading to the outside; and between a negative electrode collector of the negative electrode and a negative electrode terminal leading to the outside so as to be sealed to the case, thereby forming the secondary batteries of the present invention.

Note that, the structure of the secondary batteries of the present invention is not limited to the example described above, and the outer shape thereof can be various shapes such as a tubular shape or laminated shape.

(Positive Electrode)

First, the positive electrode that is the characteristic of the secondary batteries of the present invention will be described.

The positive electrode is a sheet-like member, and can be formed by applying a positive electrode mixture containing the positive electrode active material of the present invention, for example, onto the surface of a collector formed of an aluminum foil, and by drying the mixture. However, a preparation method of the positive electrode is not particularly limited. For example, it is also possible to prepare the positive electrode by supporting the positive electrode mixture containing the positive electrode active material particles and a binding agent on a belt-like positive electrode core (the positive electrode collector).

Note that, the positive electrode is suitably treated in accordance with batteries to be used, for example, a cutting treatment for forming the positive electrode to have a suitable size in accordance with target batteries, a pressure compression treatment using a roll press or the like for increasing an electrode density, and the like.

(Positive Electrode Mixture)

The positive electrode mixture can be formed by adding a solvent to a positive electrode agent formed by mixing the powder-like positive electrode active material of the present invention, a conductive material, and a binding agent, and by kneading the solvent and the positive electrode agent.

Hereinafter, the materials configuring the positive electrode mixture other than the positive electrode active material will be described.

[Binding Agent]

Any of a thermoplastic resin and a thermosetting resin may be used as the binding agent of the positive electrode mixture, but the thermoplastic resin is preferable.

Examples of the thermoplastic resin to be used include polyethylene, polypropylene, polytetrafluoroethylene (PTFE), polyvinylidene fluoride (PVDF), styrene butadiene rubber, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, an ethylene-methacrylic acid copolymer, an ethylene-acrylic acid methyl copolymer, an ethylene-methacrylic acid methyl copolymer, and the like.

The resins described above may be independently used, or may be used in combination of two or more types thereof. In addition, the resins may be a cross-linked body of $Na^+$ ions and the like.

[Conductive Material]

The conductive material of the positive electrode mixture is not particularly limited, as long as it may be an electronic conductive material that is chemically stable in the batteries. The conductive materials for use may, for example, be graphites such as natural graphite (scale-like graphite or the like) and artificial graphite, carbon blacks such as acetylene black, Ketjen black, channel black, furnace black, lamp black, and thermal black, conductive fibers such as a carbon fiber and a metal fiber, metal powders of aluminum and the like, conductive whiskers such as zinc oxide and potassium titanate, a conductive metal oxide such as titanium oxide, an organic conductive material such as a polyphenylene derivative, fluorinated carbon, and the like. The conductive materials may be independently used, or may be used in combination of two or more types thereof.

Note that, the amount of conductive material to be added to the positive electrode mixture is not particularly limited, but is preferably 0.5 mass % to 50 mass %, more preferably 0.5 mass % to 30 mass %, and even more preferably 0.5 mass % to 15 mass %, with respect to the positive electrode active material particles that are contained in the positive electrode mixture.

[Solvent]

The solvent dissolves the binding agent, and disperses the positive electrode active material, the conductive material, or the like in the binding agent. The solvent is not particularly limited, but, for example, an organic solvent such as N-methyl-2-pyrrolidone can be used as the solvent.

[Positive Electrode Core]

The positive electrode core (the positive electrode collector) is not particularly limited, as long as it may be an electronic conductor that is chemically stable in the batteries. For example, a foil or a sheet formed of aluminum, stainless steel, nickel, titanium, carbon, a conductive resin, and the like can be used. Among them, an aluminum foil, an aluminum alloy foil, and the like are more preferable.

Here, a layer of carbon or titanium can be applied, or an oxide layer can be formed, on the surface of the foil or the sheet. In addition, irregularity can be imparted to the surface of the foil or the sheet, and a net, a punching sheet, a lath body, a porous body, a foam, a fiber group molded body, and the like can be used.

The thickness of the positive electrode core is not particularly limited, but, for example, is preferably 1 μm to 500 μm.

(Components Other than Positive Electrode)

Next, in the components of the non-aqueous electrolyte secondary batteries of the present invention, the components other than the positive electrode will be described.

Note that, the non-aqueous electrolyte secondary battery of the present invention is characterized by using the positive electrode active material described above, and other components can be suitably selected in accordance with the application thereof and performance to be required, but are not limited to any of those described below.

(Negative Electrode)

The negative electrode is not particularly limited, as long as it is capable of charging and discharging lithium.

For example, it is possible to use a negative electrode in which a negative electrode mixture that contains a negative electrode active material and a binding agent, and contains a conductive material or a thickener as an arbitrary component is supported on a negative electrode core. Such a negative electrode can be prepared by the same method as that of the positive electrode.

It is sufficient that the negative electrode active material is a material that is capable of electrochemically charging and discharging lithium. For example, graphites, a non-graphitizable carbon material, a lithium alloy, and the like can be used.

Though the lithium alloy is not particularly limited, it is preferred to use an alloy containing at least one type of element selected from the group consisting of silicon, tin, aluminum, zinc, and magnesium.

In addition, an average particle size of the negative electrode active material is not particularly limited, but, for example, is preferably 1 μm to 30 μm.

[Binding Agent]

Any of a thermoplastic resin and a thermosetting resin may be used as the binding agent of the negative electrode mixture, but the thermoplastic resin is preferable.

The thermoplastic resin is not particularly limited, but examples of the thermoplastic resin include polyethylene, polypropylene, polytetrafluoroethylene (PTFE), polyvinylidene fluoride (PVDF), styrene butadiene rubber, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), vinylidene a fluoride-hexafluoropropylene-tetrafluoroethylene copolymer, a vinylidene fluoride-perfluoromethyl vinyl ether-tetrafluoroethylene copolymer, an ethylene-acrylic acid copolymer, an ethylene-methacrylic acid copolymer, an ethylene-acrylic acid methyl copolymer, an ethylene-methacrylic acid methyl copolymer, and the like.

The thermoplastic resins may be independently used, or may be used in combination of two or more types thereof. In addition, the resins may be a cross-linked body of $Na^+$ ions and the like.

[Conductive Material]

It is sufficient that the conductive material of the negative electrode mixture is an electronic conductive material that is chemically stable in the batteries, but the conductive material is not particularly limited. For example, graphites such as natural graphite (scale-like graphite and the like), and artificial graphite, carbon blacks such as acetylene black, Ketjen black, channel black, furnace black, lamp black, and thermal black, conductive fibers such as a carbon fiber and a metal fiber, metal powders of copper, nickel, and the like, an organic conductive material such as a polyphenylene derivative, and the like can be used. The thermoplastic resins may be independently used, or may be used in combination of two or more types thereof.

An addition amount of the conductive material is not particularly limited, but is preferably 1 mass % to 30 mass %, and is more preferably 1 mass % to 10 mass %, with respect to the negative electrode active material particles contained in the negative electrode mixture.

[Negative Electrode Core]

It is sufficient that the negative electrode core (the negative electrode collector) is an electronic conductor that is chemically stable in the batteries, but the negative electrode core is not particularly limited. It is possible to use, for example, a foil or a sheet formed of stainless steel, nickel, copper, titanium, carbon, a conductive resin, and the like, and to preferably use copper and a copper alloy.

A layer of carbon, titanium, nickel, or the like can be applied, or an oxide layer can be formed, on the surface of the foil or the sheet. In addition, irregularity can be imparted to the surface of the foil or the sheet, and a net, a punching sheet, a lath body, a porous body, a foam, a fiber group molded body, and the like can also be used.

The thickness of the negative electrode core is not particularly limited, but, for example, is preferably 1 μm to 500 μm.

(Non-Aqueous Electrolyte Solution)

A non-aqueous solvent in which a lithium salt is dissolved is preferable as the non-aqueous electrolyte solution.

The non-aqueous solvent to use is not particularly limited. Examples of the non-aqueous solvent may include cyclic carbonates such as ethylene carbonate (EC), propylene carbonate (PC), butylene carbonate (BC), and vinylene carbonate (VC), chain carbonates such as dimethyl carbonate (DMC), diethyl carbonate (DEC), ethyl methyl carbonate (EMC), and dipropyl carbonate (DPC), aliphatic carboxylic acid esters such as methyl formate, methyl acetate, methyl propionate, and ethyl propionate, lactones such as γ-butyrolactone and γ-valerolactone, chain ethers such as 1,2-dimethoxy ethane (DME), 1,2-diethoxy ethane (DEE), and ethoxy methoxy ethane (EME), cyclic ethers such as tetrahydrofuran and 2-methyl tetrahydrofuran, dimethyl sulfoxide, 1,3-dioxolan, formamide, acetamide, dimethyl formamide, dioxolan, acetonitrile, propyl nitrile, nitromethane, ethyl monoglyme, phosphoric acid triester, trimethoxy methane, dioxolan derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propane sultone, anisole, dimethyl sulfoxide, N-methyl-2-pyrrolidone, and the like. The thermoplastic resins may be independently used, or may be used in combination of two or more types thereof.

In particular, it is preferable to use a mixed solvent of cyclic carbonate and chain carbonate, or a mixed solvent of a cyclic carbonate, chain carbonate, and aliphatic carboxylic acid ester.

[Lithium Salt]

Examples of the lithium salt that is dissolved in the non-aqueous electrolyte solution are capable of including $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, lithium chloroborane, lithium tetraphenylborate, a lithium imide salt, and the like. The thermoplastic resins may be independently used, or may be used in combination of two or more types thereof. Note that, it is preferable to use at least $LiPF_6$.

In addition, a lithium salt concentration in the non-aqueous solvent is not particularly limited, but is preferably 0.2 mol/L to 2 mol/L, and is more preferably 0.5 mol/L to 1.5 mol/L.

[Other Additives]

In order to improve the charge and discharge characteristic of the batteries, various additives may be added to the non-aqueous electrolyte solution, in addition to the lithium salt.

The additive is not particularly limited, but examples of the additive may include triethyl phosphite, triethanolamine, cyclic ether, ethylene diamine, n-glyme, pyridine, hexaphosphoric triamide, nitrobenzene derivative, crown ethers, quaternary ammonium salt, ethylene glycol dialkyl ether, and the like.

[Solid Electrolyte]

In addition, a solid electrolyte may be used as the non-aqueous electrolyte. The solid electrolyte has properties that can withstand a high voltage. Examples of the solid electrolyte include an inorganic solid electrolyte and an organic solid electrolyte.

An oxide-based solid electrolyte, a sulfide solid electrolyte, and the like are used as the inorganic solid electrolyte.

The oxide-based solid electrolyte is not particularly limited, but an oxide-based solid electrolyte that contains oxygen (O) and has lithium ion conductivity and electronic insulating properties can be used.

Examples of the oxide-based solid electrolyte include lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ (0≤X≤1), $Li_{1+X}Al_XGe_{2-X}(PO_4)_3$ (0≤X≤1), $LiTi_2(PO_4)_3$, $Li_{3X}La_{2/3-X}TiO_3$ (0≤X≤2/3), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide solid electrolyte is not particularly limited. It is possible to use a sulfide solid electrolyte that contains sulfur (S) and has lithium ion conductivity and electronic insulating properties.

Examples of the sulfide solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like.

Note that, inorganic solid electrolytes other than the inorganic solid electrolytes described above may be used, and for example, $Li_3N$, $LiI$, $Li_3N$—$LiI$—$LiOH$, and the like may be used.

The organic solid electrolyte is not particularly limited insofar as the organic solid electrolyte is a high-molecular compound that exhibits ion conductivity, and for example, polyethylene oxide, polypropylene oxide, a copolymer thereof, and the like can be used. In addition, the organic solid electrolyte may contain the lithium salt described above.

(Separator)

In addition, a fine separator is interposed between the positive electrode and the negative electrode.

The separator is not particularly limited, but a microporous thin film that has large ion permeability, a predetermined mechanical strength, and insulating properties is preferable. In particular, it is preferred to use a microporous thin film having a function of increasing the resistance by blocking pores at a constant temperature or higher.

The material of the microporous thin film is not particularly limited, but for example, polyolefin having excellent organic solvent resistance and hydrophobicity, such as polypropylene and polyethylene, can be used. In addition, a sheet prepared from a glass fiber or the like, a non-woven fabric, a woven fabric, and the like can also be used.

When the separator is the microporous thin film, the pore diameter of the pore that is formed in the separator is not particularly limited, but for example, is preferably 0.01 μm to 1 μm. The porosity of the separator is not particularly limited, but in general, is preferably 30% to 80%. In addition, the thickness of the separator is not particularly limited, but in general, is preferably 10 μm to 300 μm.

Further, a separator that is separated from the positive electrode and the negative electrode may be used, but a polymer electrolyte formed of a non-aqueous electrolyte solution and a polymer material retaining the non-aqueous electrolyte solution can be integrated with the positive electrode or the negative electrode, and can also be used as the separator.

The polymer material is not particularly limited insofar as the polymer material is capable of retaining the non-aqueous electrolyte solution, but a copolymer of vinylidene fluoride and hexafluoropropylene is preferable.

EXAMPLES

Hereinafter, the present invention will be described in more detail by examples of the present invention and comparative examples, but the present invention is not limited to the examples.

Note that, in the examples and the comparative examples, the following methods were used in an analysis method of the metal of the lithium nickel composite oxide and a crystallite diameter.

(1) Metal Analysis: Performed by an ICP Emission Spectrometry.

(2) Crystallite Diameter: Performed by Using an XRD Diffraction Device (X'Pert PRO, Manufactured by Malvern Panalytical Ltd.).

[Preparation Method of Secondary Battery for Battery Performance Evaluation]

In the evaluation of battery performance of non-aqueous electrolyte secondary batteries in which lithium nickel composite oxide of the present invention was adopted as the positive electrode active material, a 2032-coin-type battery (hereinafter, referred to as a coin-type battery 1) illustrated in FIG. 1 was used.

As illustrated in FIG. 1, the coin-type battery 1 includes a case 2 and an electrode 3 that is contained in the case 2. The case 2 includes a hollow positive electrode can 2a of which one end is open and a negative electrode can 2b that is disposed in an opening portion of the positive electrode can 2a, and is configured such that when the negative electrode can 2b is disposed in the opening portion of the positive electrode can 2a, a space for containing the electrode 3 is formed between the negative electrode can 2b and the positive electrode can 2a. The electrode 3 includes a positive electrode (an electrode for evaluation) 3a, a separator 3c, and a negative electrode (a lithium-metal negative electrode) 3b that are laminated in this order, and is contained in the case 2 such that the positive electrode 3a is in contact with an inner surface of the positive electrode can 2a, and the negative electrode 3b is in contact with an inner surface of the negative electrode can 2b.

Note that, the case 2 includes a gasket 2c by which a relative movement is fixed that the positive electrode can 2a and the negative electrode can 2b are maintained in a non-contact state. In addition, the gasket 2c also has a function of sealing a gap between the positive electrode can 2a and the negative electrode can 2b, and of air-tightly and liquid-tightly blocking the case 2 from the outside.

The coin-type battery 1 described above was prepared by the following production method.

First, 5 parts by weight of acetylene black and 5 parts by weight of polyvinylidene fluoride were mixed with 90 parts by weight of a positive electrode active material powder, and n-methyl pyrrolidone was added thereto to form a paste. The paste that was prepared was applied onto an aluminum foil having a thickness of 20 μm. Note that, the paste was applied such that the weight of positive electrode active material after drying was 0.05 g/cm$^2$. After that, the aluminum foil coated with the paste was vacuum dried at 120° C., and then, was punched into the shape of a circular disk having a diameter of 1 cm, and thus, the positive electrode 3a was obtained.

The coin-type battery 1 described above was prepared in a glove box under an Ar atmosphere in which a dew point was managed at −80° C., by using the positive electrode 3a, the negative electrode 3b, the separator 3c, and an electrolyte solution. Note that, a lithium-metal punched into the shape of a circular disk having a diameter of 15 mm was used in the negative electrode 3b. A polyethylene porous film having a film thickness of 20 μm was used in the separator 3c.

An equivalent mixed solution (manufactured by Ube Industries, Ltd.) of ethylene carbonate (EC) and diethyl carbonate (DEC) containing 1 M of LiClO$_4$ as a supporting salt was used in the electrolyte solution.

Battery characteristic was evaluated by using the coin-type battery that was prepared. An initial discharge capacity and a positive electrode reaction resistance were measured as the battery characteristic.

The initial discharge capacity was measured by the following method. First, the coin-type battery 1 was prepared, and then, was left to stand for approximately 24 hours. After an open circuit voltage OCV was stabilized, a current density with respect to the positive electrode was 0.1 mA/cm$^2$, charge was performed until a cutoff voltage was 4.3 V, and discharge was performed until the cutoff voltage was 3.0 V after a one-hour pause. Then, a capacity when discharge was performed until the cutoff voltage was 3.0 V was assumed as the initial discharge capacity.

Next, the positive electrode reaction resistance was calculated by the following method.

Figure 2:
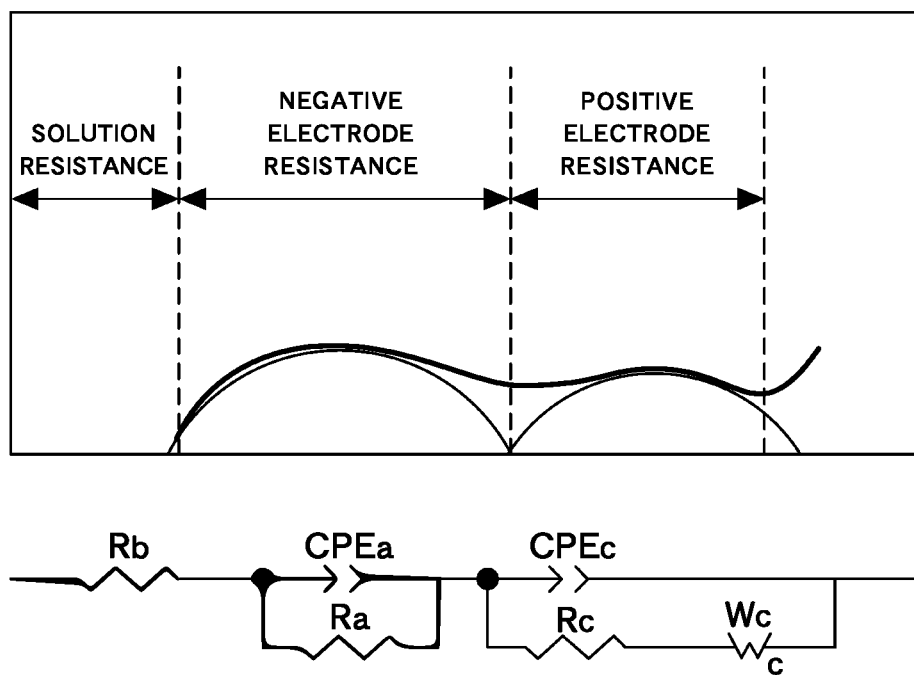
FIG. 2 is a schematic explanatory diagram of an equivalent circuit that is used in a measurement example and analysis of impedance evaluation.

First, the coin-type battery of each of the examples is charged at a charge potential of 4.1 V, and an electric resistance is measured by an alternating-current impedance method with a frequency response analyzer and a potentiogalvanostat (1255B, manufactured by SOLARTRON METROLOGY LIMITED). If the relationship between a measurement mechanism and a frequency is shown in a graph, a Nyquist plot illustrated in FIG. 2 is obtained.

The Nyquist plot is represented as the sum of characteristic curves indicating a solution resistance, a negative electrode resistance and a capacity thereof, and a positive electrode resistance and a capacity thereof, and thus, fitting calculation was performed by using an equivalent circuit based on the Nyquist plot, and the value of the positive electrode reaction resistance was calculated.

Example 1

First, a temperature in a reaction tank was set to 49.5° C., a mixed aqueous solution of nickel sulfate and cobalt sulfate, an aqueous solution of sodium aluminate, and 25 mass % of ammonia water were added to a reaction solution while the reaction solution in the reaction tank was retained at pH 13.0 at a liquid temperature of 25° C. by 20 mass % of a sodium hydroxide solution, and recovery was performed by overflow. Further, washing was performed with 45 g/L of an aqueous solution of sodium hydroxide of which the pH at the liquid temperature of 25° C. was 12.5, and then, water washing was performed, and drying was performed, and thus, a nickel composite hydroxide was obtained (a neutralization crystallization method).

The nickel composite hydroxide was formed of secondary particles that were formed by aggregating a plurality of primary particles of 1 μm or less into the shape of a sphere, and analyzed by an ICP method. Then, it was found that the nickel composite hydroxide has a molar ratio of Ni:Co:Al of 91:5:4. A volume-based average particle size MV of the nickel composite hydroxide according to laser diffraction scattering method measurement was 13 μm. In addition, quantitative analysis was performed with respect to sulfur by an ICP emission spectrometry, and sulfate radical content was obtained by multiplying by a coefficient, assuming that all sulfur was oxidized to be a sulfate radical ($SO_4$), and thus, the sulfate radical content was 0.28 mass %. A sulfate radical content of the nickel composite hydroxide is shown in Table 1.

Next, the nickel composite hydroxide was oxidation roasted at a temperature of 600° C. in the atmosphere, and a nickel composite oxide was obtained, and then, the nickel composite oxide and lithium hydroxide were weighed and mixed such that the molar ratio of Ni:Co:Al was 91:5:4, and Li/(Ni+Co+Al) was 1.020, and thus, a lithium mixture was obtained.

The obtained lithium mixture was calcinated at a temperature of 500° C. for 3 hours in an oxygen atmosphere by using an electric furnace, and then, was retained at 760° C. for 3 hours, and was fired for 20 hours from the start of temperature rising to the end of the retention. After that, cooling was performed to a room temperature in the furnace, and a crushing treatment was performed, and thus, a fired powder to which an aluminum compound was added (hereinafter, referred to as a base material) was obtained.

The obtained base material was analyzed by an ICP method, and thus, it was found that the molar ratio of Ni:Co:Al was 91:5:4, and Li/(Ni+Co+Al) was 1.018.

Next, pure water at 20° C. was added to the obtained base material, and a slurry was obtained in which 1500 g of the base material was contained with respect to 1 L of water, the slurry was stirred for 20 minutes, and then, was passed through a filter press, and was dehydrated, thereby preparing a cleaned cake in a wet state.

Next, 0.60 g of aluminum hydroxide (Al(OH)$_3$) was added to the cleaned cake such that an aluminum amount was 0.05 atom % with respect to the total number of atoms of Ni, Co, and Al contained in the lithium nickel composite oxide of the cleaned cake, and was sufficiently mixed at a room temperature (25° C.) by using a shaker mixer device (TURBULA TypeT2C, manufactured by Willy A. Bachofen (WAB) AG), and thus, a mixed powder was obtained. Note that, "the aluminum amount" and "the tungsten amount" described in the examples are a numerical value indicating a compounding value, and there may be a difference from analysis values shown in Table 1.

The mixed powder that was obtained was put into an aluminum bag, was laminated after nitrogen gas purge, and was put into a dryer that was warmed at 80° C., for approximately 1 hour. The mixed powder was taken out from the aluminum bag after being warmed, was put into an SUS container, and was stationary dried for 10 hours by using a vacuum dryer that was warmed at 190° C., and then, the furnace was cooled.

Finally, the mixed powder was crushed by a sieve having a mesh size of 38 μm, thereby obtaining a positive electrode active material containing $LiAl_2(OH)_7 \cdot xH_2O$ that was an LiAl compound on the surfaces of the primary particles.

The composition of the obtained positive electrode active material was analyzed by an ICP method, and thus, it was found that the molar ratio of Ni:Co:Al in the lithium nickel composite oxide was 91:5:4, and Li/(Ni+Co+Al) was 0.985 ($Li_{0.985}Ni_{0.91}Co_{0.05}Al_{0.04}O_2$), the aluminum amount contained in the LiAl compound was 0.05 atom % with respect to the total number of atoms of Ni, Co, and Al contained in the lithium nickel composite oxide.

In addition, as a result of observing a sectional surface of the obtained positive electrode active material, it was also found that particulate $LiAl_2(OH)_7 \cdot xH_2O$ having a particle size of 30 nm to 50 nm, existed on the surfaces of the primary particles.

[Battery Evaluation]

Battery characteristic of the obtained positive electrode active material was evaluated. Note that, the positive electrode resistance of Example 1 was set to 1.00, and a relative value was set to an evaluation value.

Hereinafter, in Examples 2 to 7 and Comparative Examples 1 to 5, only conditions that are changed from Example 1 described above will be described. In addition, in Examples 1 to 7 and Comparative Examples 1 to 5, the composition (the molar ratio of Ni:Co:Al) of the lithium nickel composite oxide (the base material), an aluminum (Al) amount contained in the LiAl compound, the crystallite diameter, the discharge capacity, and the evaluation value of the positive electrode resistance are shown in Table 1.

Example 2

A positive electrode active material was obtained and evaluation was performed in the same manner as Example 1, except that 1.2 g of the aluminum hydroxide ($Al(OH)_3$) was added to the cleaned cake such that the aluminum amount was 0.10 atom % with respect to the total number of atoms of Ni, Co, and Al contained in the lithium nickel composite oxide. Results thereof are shown in Table 1.

Example 3

A positive electrode active material was obtained, and evaluation was performed in the same manner as Example 1, except that 2.4 g of the aluminum hydroxide ($Al(OH)_3$) was added to the cleaned cake such that the aluminum amount was 0.20 atom % with respect to the total number of atoms of Ni, Co, and Al contained in the lithium nickel composite oxide. Results thereof are shown in Table 1.

Example 4

A positive electrode active material was obtained and evaluation was performed in the same manner as Example 1, except that the nickel composite hydroxide was crystallized such that the molar ratio of Ni:Co:Al was 88:8:4. Results thereof are shown in Table 1.

Example 5

A positive electrode active material was obtained, and evaluation was performed in the same manner as Example 1, except that the nickel composite hydroxide was crystallized such that the molar ratio of Ni:Co:Al was 88:8:4, and 1.2 g of the aluminum hydroxide ($Al(OH)_3$) was added to the cleaned cake such that the aluminum amount was 0.10 atom % with respect to the total number of atoms of Ni, Co, and Al contained in the lithium nickel composite oxide. Results thereof are shown in Table 1.

Example 6

A positive electrode active material was obtained, and evaluation was performed in the same manner as Example 1, except that the nickel composite hydroxide was crystallized such that the molar ratio of Ni:Co:Al was 88:8:4, and 2.4 g of the aluminum hydroxide ($Al(OH)_3$) was added to the cleaned cake such that the aluminum amount was 0.20 atom % with respect to the total number of atoms of Ni, Co, and Al contained in the lithium nickel composite oxide. Results thereof are shown in Table 1.

Example 7

A positive electrode active material was obtained, and evaluation was performed in the same manner as Example 1, except that the nickel composite hydroxide was crystallized such that the molar ratio of Ni:Co:Al was 82:15:3. Results thereof are shown in Table 1.

Comparative Example 1

A positive electrode active material was obtained, and evaluation was performed in the same manner as Example 1, except that the aluminum hydroxide ($Al(OH)_3$) was not added to the cleaned cake. Results thereof are shown in Table 1.

Comparative Example 2

A positive electrode active material was obtained and evaluation was performed in the same manner as Example 1, except that 6.6 g of the aluminum hydroxide ($Al(OH)_3$) was added to the cleaned cake such that the aluminum amount was 0.55 atom % with respect to the total number of atoms of Ni, Co, and Al contained in the lithium nickel composite oxide. Results thereof are shown in Table 1.

Comparative Example 3

A positive electrode active material was obtained, and evaluation was performed in the same manner as Example 1, except that the nickel composite hydroxide was crystallized such that the molar ratio of Ni:Co:Al was 88:8:4, and the aluminum hydroxide ($Al(OH)_3$) was not added to the cleaned cake. Results thereof are shown in Table 1.

Comparative Example 4

A positive electrode active material was obtained, and evaluation was performed in the same manner as Example 1, except that the nickel composite hydroxide was crystallized such that the molar ratio of Ni:Co:Al was 88:8:4, and 6.7 g of the aluminum hydroxide ($Al(OH)_3$) was added to the cleaned cake such that the aluminum amount was 0.55 atom % with respect to the total number of atoms of Ni, Co, and Al contained in the lithium nickel composite oxide. Results thereof are shown in Table 1.

Comparative Example 5

A cleaned cake obtained by washing lithium nickel composite oxide particles in which the molar ratio Ni:Co:Al of Example 1 was 91:5:4, and Li/(Ni+Co+Al) was 1.018 was stationary dried for 12 hours in a vacuum dryer that was warmed at 150° C., and then, a furnace was cooled, to obtain a base material.

0.3 g of aluminum oxide ($Al_2O_3$) having an average particle size of 0.02 μm was added to 97 g of the base material, and was sufficiently mixed at a room temperature (25° C.) by using a shaker mixer device. A mixture obtained was fired for 8 hours in the atmosphere using an electric furnace that was heated at 700° C., was crushed after cooled, to obtain a positive electrode active material of which the surface was coated with an LiAl compound (an LiAl composite oxide) by solid-phase diffusion. The positive electrode active material was evaluated in the same manner as Example 1. Results thereof are shown in Table 1.

TABLE 1

| | Base material composition [molar ratio Ni:Co:Al] | Al amount in LiAl compound [atom %] | Crystallite diameter [Å] | Discharge capacity [mAh/g] | Positive electrode resistance |
|---|---|---|---|---|---|
| Example 1 | 91:5:4 | 0.05 | 1478 | 216 | 1.00 |
| Example 2 | 91:5:4 | 0.10 | 1479 | 217 | 0.98 |
| Example 3 | 91:5:4 | 0.20 | 1475 | 215 | 1.01 |
| Example 4 | 88:8:4 | 0.05 | 1435 | 209 | 0.97 |
| Example 5 | 88:8:4 | 0.09 | 1437 | 209 | 0.96 |
| Example 6 | 88:8:4 | 0.19 | 1431 | 208 | 0.99 |
| Example 7 | 82:15:3 | 0.05 | 1394 | 201 | 0.90 |
| Comparative Example 1 | 91:5:4 | — | 1482 | 203 | 1.52 |
| Comparative Example 2 | 91:5:4 | 0.53 | 1464 | 205 | 1.25 |
| Comparative Example 3 | 88:8:4 | — | 1439 | 195 | 1.46 |
| Comparative Example 4 | 88:8:4 | 0.52 | 1417 | 198 | 1.20 |
| Comparative Example 5 | 91:5:4 | 0.20 | 1480 | 209 | 1.17 |

[Evaluation]

As obvious from Table 1, the positive electrode active materials of Examples 1 to 6 are produced in accordance with the present invention, and thus, have a high discharge capacity and low positive electrode resistance, compared to Comparative Examples 1 to 5. Therefore, they are the positive electrode active material for non-aqueous electrolyte secondary batteries having a high capacity and high output.

The positive electrode active material of Example 7 in which the molar ratio of Ni is as low as 82 has a discharge capacity equal to or greater than that of Comparative Example 3 or Comparative Example 4 in which the molar ratio of Ni is as high as 88, and has a sufficiently low positive electrode resistance. Thus, it is the positive electrode active material for non-aqueous electrolyte secondary batteries having a high capacity and high output.

INDUSTRIAL APPLICABILITY

The non-aqueous electrolyte secondary batteries of the present invention provide a non-aqueous electrolyte secondary battery having a high capacity and high safety. Thus, they are particularly preferable as a chargeable/dischargeable secondary batteries that are used in a small mobile electronic device (a laptop type personal computer, a mobile phone terminal, and the like).

REFERENCE SIGNS LIST

1 COIN-TYPE BATTERY
2 CASE
2a POSITIVE ELECTRODE CAN
2b NEGATIVE ELECTRODE CAN
2c GASKET
3 ELECTRODE
3a POSITIVE ELECTRODE
3b NEGATIVE ELECTRODE
3c SEPARATOR

The invention claimed is:

1. A positive electrode active material for non-aqueous electrolyte secondary batteries, comprising: primary particles of a lithium nickel composite oxide represented by at least General Formula: $Li_zNi_{1-x-y}Co_xM_yO_2$ ($0.95 \leq z \leq 1.03$, $0 < x \leq 0.20$, $0 < y \leq 0.10$, $x+y \leq 0.20$, and M is at least one type of element selected from the group consisting of Mg, Al, Ca, Ti, V, Cr, Mn, Nb, Zr, and Mo); and secondary particles configured by aggregating the primary particles,
wherein a LiAl compound in particulate form with a particle size of 1 nm to 100 nm is provided on surfaces of the primary particles; and
wherein an Al amount contained in the LiAl compound is 0.01 atom % to 0.50 atom % with respect to the total number of atoms of Ni, Co, and M contained in the lithium nickel composite oxide of the primary particles.

2. The positive electrode active material for non-aqueous electrolyte secondary batteries, according to claim 1, wherein the LiAl compound is at least one type selected from a group consisting of $LiAl_2(OH)_7 \cdot xH_2O$, $LiH(AlO_2)_2 \cdot 5H_2O$, and $LiAlO_2$.

3. The positive electrode active material for non-aqueous electrolyte secondary batteries, according to claim 1, wherein a crystallite diameter that is calculated from a peak of a (003) surface in X-ray diffraction (XRD) of the lithium nickel composite oxide is 1350 Å to 1500 Å.

4. A non-aqueous electrolyte secondary battery, comprising a positive electrode containing the positive electrode active material for non-aqueous electrolyte secondary batteries according to claim 1.

5. The positive electrode active material for non-aqueous electrolyte secondary batteries, according to claim 2, wherein a crystallite diameter that is calculated from a peak of a (003) surface in X-ray diffraction (XRD) of the lithium nickel composite oxide is 1350 Å to 1500 Å.

6. The positive electrode active material for non-aqueous electrolyte secondary batteries, according to claim 1, wherein the Al amount contained in the LiAl compound is 0.05 atom % to 0.50 atom %.

7. A production method for a positive electrode active material for non-aqueous electrolyte secondary batteries containing a lithium nickel composite oxide,
the method comprising processes of (A) to (D) as will be described below in order of the processes of (A) to (D):
(A) a process of mixing a nickel compound containing at least nickel, cobalt, and at least one type selected from Mg, Al, Ca, Ti, V, Cr, Mn, Nb, Zr, and Mo, and a lithium compound, and then, of firing the compounds in a temperature range of 720° C. to 770° C. in an oxidizing atmosphere, and thus, of preparing a fired powder of a lithium nickel composite oxide that is represented by General Formula: $Li_zNi_{1-x-y}Co_xM_yO_2$ (0.95≤z≤1.03, 0<x≤0.20, 0<y≤0.10, x+y≤0.20, and M is at least one type of element selected from the group consisting of Mg, Al, Ca, Ti, V, Cr, Mn, Nb, Zr, and Mo) and contains primary particles and secondary particles configured by aggregating the primary particles;
(B) a process of forming a slurry such that an amount of the fired powder of the lithium nickel composite oxide is 1000 g to 2000 g with respect to 1 L of water, and of obtaining a cleaned cake by performing a water washing treatment with respect to the fired powder of the lithium nickel composite oxide that is prepared in the process of (A);
(C) a process of adding an aluminum compound to the cleaned cake of the process of (B), and of mixing the aluminum compound and the cake, wherein an Al amount contained in the aluminum compound is 0.01 atom % to 0.50 atom % with respect to the total number of atoms of Ni, Co, and M contained in the lithium nickel composite oxide; and
(D) a process of performing a thermal treatment with respect to the mixture of the fired powder of the lithium nickel composite oxide and the aluminum compound that is prepared in the process of (C), at 100° C. to 600° C. in an oxygen atmosphere or vacuum atmosphere to form a LiAl compound in particulate form with a particle size of 1 nm to 100 nm on surfaces of the primary particles of the fired powder of the lithium nickel composite oxide.

8. The production method for a positive electrode active material for non-aqueous electrolyte secondary batteries, according to claim 7,
wherein the nickel compound is any one of
a nickel composite hydroxide,
a nickel oxy composite hydroxide obtained by performing oxidation with respect to the nickel composite hydroxide with an oxidant,
a nickel composite oxide obtained by performing oxidation roasting with respect to the nickel oxy composite hydroxide at a temperature of 500° C. to 750° C.,
a nickel composite oxide obtained by performing oxidation roasting with respect to the nickel composite hydroxide at a temperature of 500° C. to 750° C., or
a nickel composite oxide obtained by performing oxidation roasting with respect to a mixture of the nickel composite hydroxide and the nickel oxy composite hydroxide at a temperature of 500° C. to 750° C.

9. The production method for a positive electrode active material for non-aqueous electrolyte secondary batteries, according to claim 7, wherein the lithium compound is at least one type selected from a group consisting of a hydroxide, an oxyhydroxide, an oxide, a carbonate, a nitrate, and a halide of lithium.

10. The production method for a positive electrode active material for non-aqueous electrolyte secondary batteries, according to claim 7, wherein in the process of (A), a mixing ratio of the nickel compound and the lithium compound is adjusted such that a lithium amount in the lithium compound with respect to a total amount of all metal elements in the nickel compound is at a molar ratio of 0.98 to 1.05.

11. The production method for a positive electrode active material for non-aqueous electrolyte secondary batteries, according to claim 7, wherein in the process of (B), a water washing temperature during the water washing treatment is adjusted to 10° C. to 40° C.

12. The production method for a positive electrode active material for non-aqueous electrolyte secondary batteries, according to claim 7, wherein the aluminum compound is aluminum hydroxide.

13. The production method for a positive electrode active material for non-aqueous electrolyte secondary batteries, according to claim 7, wherein the Al amount contained in the aluminum compound is 0.05 atom % to 0.50 atom %.

\* \* \* \* \*